US012671546B2

(12) United States Patent
Rong et al.

(10) Patent No.: US 12,671,546 B2
(45) Date of Patent: Jun. 30, 2026

(54) METHODS AND APPARATUS FOR COMMUNICATING SOUNDING REFERENCE SIGNALS WITH CONFIGURABLE FREQUENCY RESOURCE OVERLAP

(71) Applicant: Huawei Technologies Co., Ltd., Shenzhen (CN)

(72) Inventors: Zhigang Rong, San Diego, CA (US); Weimin Xiao, Hoffman Estates, IL (US); Jialing Liu, Palatine, IL (US); Qian Cheng, Naperville, IL (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 458 days.

(21) Appl. No.: 18/164,943

(22) Filed: Feb. 6, 2023

(65) Prior Publication Data

US 2023/0198714 A1    Jun. 22, 2023

Related U.S. Application Data

(63) Continuation of application No. PCT/US2021/040268, filed on Jul. 2, 2021.
(Continued)

(51) Int. Cl.
*H04L 5/00* (2006.01)
*H04W 72/0453* (2023.01)
(Continued)

(52) U.S. Cl.
CPC ....... *H04L 5/0051* (2013.01); *H04W 72/0453* (2013.01); *H04W 72/23* (2023.01); *H04W 76/20* (2018.02)

(58) Field of Classification Search
CPC . H04L 5/0051; H04L 5/0094; H04L 25/0226; H04W 72/0453; H04W 72/23; H04W 76/20; H04W 48/12
See application file for complete search history.

(56) References Cited

U.S. PATENT DOCUMENTS

| | | | |
|---|---|---|---|
| 12,206,620 B2 * | 1/2025 | Pawar | H04W 72/23 |
| 2018/0278450 A1 * | 9/2018 | Zarifi | H04W 52/325 |

(Continued)

FOREIGN PATENT DOCUMENTS

WO    WO-2021151235 A1 *    8/2021    ............ H04W 36/24

OTHER PUBLICATIONS

3GPP 38.331 UE Assistance Information Section 5.7.4 V16.2.9 (Sep. 2020) (Year: 2020).*

(Continued)

*Primary Examiner* — Jae Y Lee
(74) *Attorney, Agent, or Firm* — Slater Matsil, LLP

(57) ABSTRACT

A method implemented by a communicating device includes receiving, by the communicating device from an access node, an indication indicating a size of overlapping frequency resources; transmitting, by the communicating device to the access node, a first sounding reference signal (SRS) of an SRS resource at a first plurality of frequency resources and at a first time; and transmitting, by the communicating device to the access node, a second SRS of the SRS resource at a second plurality of frequency resources and at a second time, wherein the second plurality of frequency resources and the first plurality of frequency resources partially overlap.

15 Claims, 8 Drawing Sheets

Related U.S. Application Data

(60) Provisional application No. 63/061,506, filed on Aug. 5, 2020.

(51) Int. Cl.
    *H04W 72/23* (2023.01)
    *H04W 76/20* (2018.01)

(56) References Cited

U.S. PATENT DOCUMENTS

| | | | |
|---|---|---|---|
| 2019/0053042 A1* | 2/2019 | Phuyal | H04W 8/24 |
| 2019/0053287 A1* | 2/2019 | Lin | H04J 13/0062 |
| 2019/0141647 A1* | 5/2019 | Nimbalker | H04L 5/0048 |
| 2019/0268185 A1 | 8/2019 | Wang et al. | |
| 2019/0380123 A1* | 12/2019 | Yang | H04L 5/0023 |
| 2020/0021470 A1 | 1/2020 | Sun et al. | |
| 2020/0305143 A1* | 9/2020 | Shikari | H04W 12/037 |
| 2021/0391963 A1* | 12/2021 | Abdelghaffar | H04L 5/14 |
| 2022/0078605 A1* | 3/2022 | Alnås | H04W 8/22 |
| 2022/0095202 A1* | 3/2022 | Jain | H04W 8/02 |
| 2022/0109746 A1* | 4/2022 | Lindheimer | H04L 69/24 |
| 2022/0279595 A1* | 9/2022 | Jang | H04W 74/0841 |
| 2023/0030823 A1* | 2/2023 | Wang | H04L 5/0048 |

OTHER PUBLICATIONS

"3rd Generation Partnership Project; Technical Specification Group Radio Access Network; NR; Physical channels and modulation (Release 16)", 3GPP TS 38.211 V16.1.0, Technical Specification, Mar. 2020, 130 Pages.

"3rd Generation Partnership Project; Technical Specification Group Radio Access Network; NR; Physical layer procedures for data, (Release 16)", 3GPP TS 38.214 V16.1.0, Technical Specification, Mar. 2020, 151 Pages.

"3rd Generation Partnership Project; Technical Specification Group Radio Access Network; NR; Radio Resource Control (RRC) protocol specification, (Release 16)", 3GPP TS 38.331 V16.0.0, Technical Specification, Mar. 2020, 835 Pages.

Samsung, "SRS design for NR," 3GPP TSG RAN WG1 Meeting #90, R1-1713607, Agenda Item 6.1.2.3.5, Prague, Czechia, Aug. 21-25, 2017, 6 pages.

"3rd Generation Partnership Project; Technical Specification Group Radio Access Network; NR; Physical channels and modulation (Release 18)," 3GPP TS 38.211 V18.5.0, Dec. 2024, 166 pages.

"3rd Generation Partnership Project; Technical Specification Group Radio Access Network; NR; Physical layer procedures for data (Release 18)," 3GPP TS 38.214 V18.5.0, Dec. 2024, 300 pages.

"3rd Generation Partnership Project; Technical Specification Group Radio Access Network; NR; Radio Resource Control (RRC) protocol specification (Release 18)," 3GPP TS 38.331 V18.4.0, Dec. 2024, 1702 pages.

"TEI19 Extension of SRS frequency hopping for positioning to non-RedCap UEs [Pos_SRSHop]," 3GPP TSG-RAN WG1 Meeting #120bis, Wuhan China, Apr. 7-11, 2025, R1-2503500, 3 pages.

* cited by examiner

METHODS AND APPARATUS FOR COMMUNICATING SOUNDING REFERENCE SIGNALS WITH CONFIGURABLE FREQUENCY RESOURCE OVERLAP

CROSS-REFERENCE TO RELATED APPLICATIONS

This application is a continuation of International Application No. PCT/US2021/040268, filed on Jul. 2, 2021, entitled "Methods and Apparatus for Communicating Sounding Reference Signals," which claims the benefit of U.S. Provisional Application No. 63/061,506, filed on Aug. 5, 2020, entitled "Methods and Apparatus for Sounding Reference Signal Transmission and Reception," applications of which are hereby incorporated herein by reference in their entireties.

TECHNICAL FIELD

The present disclosure relates generally to methods and apparatus for digital communications, and, in particular embodiments, to methods and apparatus for communicating sounding reference signals (SRS).

BACKGROUND

Sounding reference signals (SRSs) are reference signals transmitted by User Equipments (UEs) in the uplink direction. SRSs may be used by base stations to estimate uplink (UL) channel quality over a wide bandwidth, and perform communication with UEs based on the uplink channel estimation. For example, a base station may utilize SRSs to perform uplink frequency selective scheduling. A base station may also use SRSs for uplink timing estimation, as part of timing alignment procedure. For example, when there is no physical uplink shared channel (PUSCH) or physical uplink control channel (PUCCH) transmission occurring in the uplink for some time, a base station may rely on SRSs for uplink timing estimation. In a time division duplexing (TDD) communication system, SRSs may also be used to estimate downlink (DL) channel state information (CSI) and to facilitate downlink scheduling and transmission via exploitation of DL/UL channel reciprocity. In a frequency division duplexing (FDD) communication system, SRSs may also be used to estimate partial DL CSI via exploitation of DL/UL reciprocity of channel angle and channel delay. The angle and delay information of DL CSI may then be used to facilitate DL multiple input multiple output (MIMO) transmissions.

SUMMARY

According to a first aspect, a method implemented by a communicating device is provided. The method comprising: receiving, by the communicating device from an access node, an indication indicating a size of overlapping frequency resources; transmitting, by the communicating device to the access node, a first sounding reference signal (SRS) of an SRS resource at a first plurality of frequency resources and at a first time; and transmitting, by the communicating device to the access node, a second SRS of the SRS resource at a second plurality of frequency resources and at a second time, wherein the second plurality of frequency resources and the first plurality of frequency resources partially overlap.

In a first implementation form of the method according to the first aspect, the indication being received prior to transmitting the first SRS.

In a second implementation form of the method according to the first aspect or any preceding implementation form of the first aspect, the indication being received over radio resource control (RRC) signaling.

In a third implementation form of the method according to the first aspect or any preceding implementation form of the first aspect, the indication being received in a medium access control (MAC) control element (CE).

In a fourth implementation form of the method according to the first aspect or any preceding implementation form of the first aspect, the indication being received in a downlink control information (DCI) message.

In a fifth implementation form of the method according to the first aspect or any preceding implementation form of the first aspect, the size of overlapping frequency resources being at least a physical resource block (PRB).

In a sixth implementation form of the method according to the first aspect or any preceding implementation form of the first aspect, the size of overlapping frequency resources being an integer multiple of a PRB.

According to a second aspect, a method implemented by an access node is provided. The method comprising: transmitting, by the access node to a communicating device, an indication indicating a size of overlapping frequency resources; receiving, by the access node from the communicating device, a first SRS of an SRS resource at a first plurality of frequency resources and at a first time; and receiving, by the access node from the communicating device, a second SRS of the SRS resource at a second plurality of frequency resources and at a second time, wherein the second plurality of frequency resources and the first plurality of frequency resources partially overlap.

In a first implementation form of the method according to the second aspect, the indication being transmitted prior to receiving the first SRS.

In a second implementation form of the method according to the second aspect or any preceding implementation form of the second aspect, the indication being transmitted over RRC signaling.

In a third implementation form of the method according to the second aspect or any preceding implementation form of the second aspect, the indication being transmitted in a MAC CE.

In a fourth implementation form of the method according to the second aspect or any preceding implementation form of the second aspect, the indication being transmitted in a DCI message.

In a fifth implementation form of the method according to the second aspect or any preceding implementation form of the second aspect, the size of overlapping frequency resources being at least a PRB.

In a sixth implementation form of the method according to the second aspect or any preceding implementation form of the second aspect, the size of overlapping frequency resources being an integer multiple of a PRB.

According to a third aspect, a user equipment is provided. The UE comprising: one or more processors; and a non-transitory memory storage comprising instructions that, when executed by the one or more processors, cause the UE to: receive, from an access node, an indication indicating a size of overlapping frequency resources; transmit, to the access node, a first SRS of an SRS resource at a first plurality of frequency resources and at a first time; and transmit, to the access node, a second SRS of the SRS resource at a second plurality of frequency resources and at a second time, wherein the second plurality of frequency resources and the first plurality of frequency resources partially overlap.

In a first implementation form of the UE according to the third aspect, the indication being received prior to transmitting the first SRS.

In a second implementation form of the UE according to the third aspect or any preceding implementation form of the third aspect, the indication being received over RRC signaling.

In a third implementation form of the UE according to the third aspect or any preceding implementation form of the third aspect, the indication being received in a MAC CE.

In a fourth implementation form of the UE according to the third aspect or any preceding implementation form of the third aspect, the indication being received in a DCI message.

In a fifth implementation form of the UE according to the third aspect or any preceding implementation form of the third aspect, the size of overlapping frequency resources being at least a PRB.

In a sixth implementation form of the UE according to the third aspect or any preceding implementation form of the third aspect, the size of overlapping frequency resources being an integer multiple of a PRB.

According to a fourth aspect, an access node is provided. The access node comprising: one or more processors; and a non-transitory memory storage comprising instructions that, when executed by the one or more processors, cause the access node to: transmit, to a UE, an indication indicating a size of overlapping frequency resources; receive, from the UE, a first SRS of an SRS resource at a first plurality of frequency resources and at a first time; and receive, from the UE, a second SRS of the SRS resource at a second plurality of frequency resources and at a second time, wherein the second plurality of frequency resources and the first plurality of frequency resources partially overlap.

In a first implementation form of the access node according to the fourth aspect, the indication being transmitted prior to receiving the first SRS.

In a second implementation form of the access node according to the fourth aspect or any preceding implementation form of the fourth aspect, the indication being transmitted over RRC signaling.

In a third implementation form of the access node according to the fourth aspect or any preceding implementation form of the fourth aspect, the indication being transmitted in a MAC CE.

In a fourth implementation form of the access node according to the fourth aspect or any preceding implementation form of the fourth aspect, the indication being transmitted in a DCI message.

In a fifth implementation form of the access node according to the fourth aspect or any preceding implementation form of the fourth aspect, the size of overlapping frequency resources being at least a PRB.

In a sixth implementation form of the access node according to the fourth aspect or any preceding implementation form of the fourth aspect, the size of overlapping frequency resources being an integer multiple of a PRB.

An advantage of a preferred embodiment is that enabling the communication device to perform frequency hopping of SRS transmission with partial frequency overlapping, wherein each hop has a portion of its frequency resources overlapping with other hops in its adjacent frequency location. Based on the measurement on the SRS over the overlapping frequency resources, the network controller may estimate a phase difference of a random phase rotation over each hop by assuming that the phase of the measured channel response should have been equal over the overlapping portion of two different hops. The network controller may then rotate back the random phase difference among hops such that the channel measurement over each hop can be combined into a wideband channel measurement. The network controller may use the wideband channel measurement to have a robust estimation of the channel delays. The channel delay information may then be utilized by the network controller to facilitate enhanced DL MIMO transmissions and to reduce CSI feedback overhead from the communication device.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The structure and use of disclosed embodiments are discussed in detail below. It should be appreciated, however, that the present disclosure provides many applicable concepts that can be embodied in a wide variety of specific contexts. The specific embodiments discussed are merely illustrative of specific structure and use of embodiments, and do not limit the scope of the disclosure.

Figure 1:
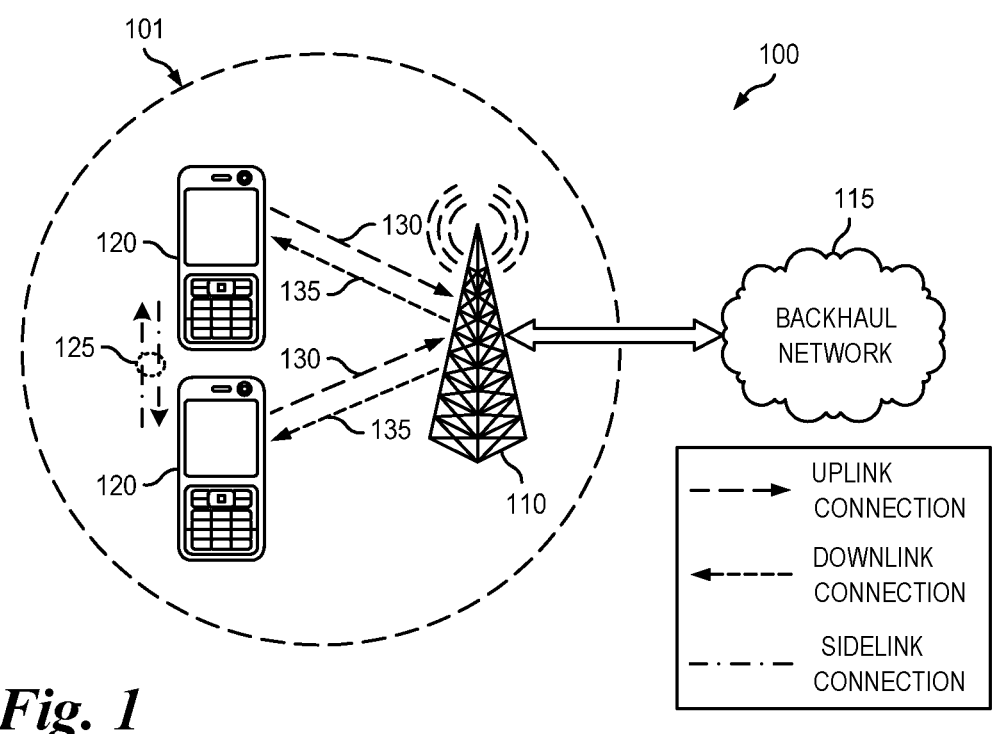
FIG. 1 illustrates a first example communications system.

FIG. 1 illustrates a first example communications system 100. Communications system 100 includes an access node 110, with coverage area 101, serving user equipments (UEs), such as UEs 120. Access node 110 is connected to a backhaul network 115 that provides connectivity to services and the Internet. In a first operating mode, communications to and from a UE passes through access node 110. In a second operating mode, communications to and from a UE do not pass through access node 110, however, access node 110 typically allocates resources used by the UE to communicate when specific conditions are met. Communication between a UE pair in the second operating mode occurs over sidelinks 125, comprising uni-directional communication links. Communication between a UE and access node pair also occur over uni-directional communication links, where the communication links between the UE and the access node are referred to as uplinks 130, and the communication links between the access node and UE is referred to as downlinks 135.

Access nodes may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, base stations, access points, transmission points (TPs), transmission-reception points (TRPs), cells, carriers, macro cells, femtocells, pico cells, and so on, while UEs may also be commonly referred to as mobile stations, mobiles, terminals, users, subscribers, stations, and the like. Access nodes may provide wireless access in accordance with one or more wireless communication protocols, e.g., the Third Generation Partnership Project (3GPP) long term evolution (LTE), LTE advanced (LTE-A), 5G, 5G LTE, 5G NR, sixth generation (6G), High Speed Packet Access (HSPA), the IEEE 802.11 family of standards, such as 802.11a/b/g/n/ac/ad/ax/ay/be, etc. While it is understood that communications systems may employ multiple access nodes capable of communicating with a number of UEs, only one access node and two UEs are illustrated for simplicity.

A cell may include one or more bandwidth parts (BWPs) for the uplink (UL) or downlink (DL) allocated for a UE. Each BWP may have its own BWP-specific numerology and configuration, such as the BWP's bandwidth and subcarrier spacing. Not all BWPs need to be active at the same time for the UE. A cell may correspond to one carrier, and in some cases, multiple carriers. Typically, one cell (a primary cell (PCell) or a secondary cell (SCell), for example) is a component carrier (a primary component carrier (PCC) or a secondary CC (SCC), for example). For some cells, each cell may include multiple carriers in the UL, one carrier is referred to as an UL carrier or non-supplementary UL (non-SUL, or simply UL) carrier which has an associated DL, and other carriers are called supplementary UL (SUL)

carriers which do not have an associated DL. A cell, or a carrier, may be configured with slot or subframe formats comprised of DL and UL symbols, and that cell or carrier is seen as operating in a time division duplexed (TDD) mode. In general, for unpaired spectrum, the cells or carriers are in TDD mode, and for paired spectrum, the cells or carrier are in a frequency division duplexed (FDD) mode. A transmission time interval (TTI) generally corresponds to a subframe (in LTE) or a slot (in 5G New Radio (NR)). For example, in 5G NR, a slot may consist of 14 orthogonal frequency division multiplex (OFDM) symbols. A resource element consists of one subcarrier during one OFDM symbol, while 12 consecutive subcarriers in the frequency domain are called a resource block (RB).

Sounding reference signals (SRSs) are transmitted by communication devices, such as a UE, to network devices, such as an access node, for uplink channel estimation. In a TDD communication system, SRSs may also be used to estimate downlink (DL) channel state information (CSI) and to facilitate downlink scheduling and transmission via exploitation of DL/UL channel reciprocity. In a FDD communication system, SRSs may also be used to estimate partial DL CSI via exploitation of DL/UL reciprocity of channel angle and channel delay. The angle and delay information of DL CSI may then be used to facilitate DL multiple input multiple output (MIMO) transmissions and to reduce CSI feedback overhead from the communication device.

The access node measures the UL channel angle and delay based on measurement of SRS. With respect to the angle measurement, because the access node is generally equipped with large number of antennas and can form narrow receiving beams, robust measurement of the angle is feasible.

Regarding the delay measurement, due to the difference in transmit power between the DL and UL, the UE might need to concentrate its' transmit power in a narrow bandwidth on the UL, and utilize frequency hopping to sound the whole sounding bandwidth. Conventionally, with frequency hopping, each hop of the SRS within a hopping cycle covers a different and disjoint portion of the entire (or whole) sounding bandwidth, i.e., there is no overlapping between the frequency resources used by different hops within a hopping cycle. When SRS frequency hopping is utilized, it is possible that a random phase rotation is introduced to each hop of the SRS. In that case, the performance of channel delay estimation based on each hop of the SRS might be negatively impacted. The reason is that the measurement over each hop of the SRS cannot be directly combined to form a wideband channel measurement due to the random phase rotation present in each hop. Compared to the case where SRS frequency hopping is not required and wideband channel measurement is available, there will be performance loss on channel delay estimation when frequency hopping is utilized. The performance loss may be on the order of 10 dB depending on the SRS configuration, for example.

Embodiments of the present disclosure provide methods and apparatus for enhanced SRS frequency hopping transmission with partial frequency resources overlapping. According to some embodiments, a communication device may transmit to a network controller, a first SRS of an SRS resource at a first plurality of frequency resources at a first hop; and transmit, by the communication device to the network controller, a second SRS of the SRS resource at a second plurality of frequency resources at a second hop, wherein the second plurality of frequency resources and the first plurality of frequency resources partially overlap. This is different from existing frequency hopping of SRS transmission, where the frequency resources used by different hops within a hopping cycle are totally different and disjoint, i.e., there is no overlapping.

In an embodiment, the size of the overlapping frequency resources may be indicated from the access node to the UE in a radio resource control (RRC) message, in a medium access control (MAC) control element (CE), or in a downlink control information (DCI) message. The size of the overlapping frequency resources is at least a physical resource block (PRB), e.g., an integer multiple of PRBs. In an embodiment, the size of the overlapping frequency resources is equal for UEs served by a single AN. In an embodiment, the size of the overlapping frequency resources is equal for all UEs served by ANs operating in a local area. In an embodiment, the size of the overlapping frequency resources may be different for UEs served by a single AN. In an embodiment, the size of the overlapping frequency resources may be different for UEs served by different ANs. After receiving the indication of the size of the overlapping frequency resources, the UE may then determine the frequency domain starting position of each hop over time accordingly. The UE may then transmit the SRSs according to the frequency domain starting position of each hop. Details of the embodiments will be provided in the following description provided below.

The embodiments enable enhanced SRS frequency hopping transmission, wherein each hop has a portion of its frequency resources overlap with the frequency resources of other hops that are adjacent to its frequency location. Based on the measurement of the SRS over the overlapping frequency resources, the access node estimates a phase difference associated with a random phase rotation over each hop by assuming that the phase of the measured channel response should have been equal over the overlapping portion of two different hops. The access node may then rotate back the random phase difference among hops such that the channel measurement over each hop can be combined into a wideband channel measurement. The access node may use the wideband channel measurement to enable a robust estimation of the channel delays. The channel delay information may then be utilized by the network controller to facilitate enhanced DL MIMO transmissions and to reduce CSI feedback overhead from the communication device.

Generally, to provide any data channels in either uplink or downlink transmissions, such as a physical downlink shared channel (PDSCH) or a physical uplink shared channel (PUSCH), reference signals are transmitted. There are reference signals for a UE to use to perform channel estimation or measurements or signal estimation or measurements, for demodulation of physical downlink control channel (PDCCH) and other common channels as well as for some measurements and feedback, e.g., the common or cell-specific reference signal (CRS) inherited from the Release 8/9 technical specification of evolved universal terrestrial radio access (E-UTRA). A dedicated or demodulation reference signal (DMRS) may be transmitted together with the PDSCH in Release 10 of E-UTRA. The DMRS is used for channel estimation during PDSCH demodulation. In later E-UTRA releases and in NR, the DMRS is used for channel estimation during PDCCH, PDSCH, PUSCH, or PBCH demodulation.

In Release 10, the channel state information reference signal (CSI-RS) is introduced in addition to the CRS and the DMRS. The CSI-RS is used by Release 10 UEs to measure the channel status, especially for multiple antennas cases. Precoding matrix indicator (PMI), channel quality indicator (CQI), rank indicator (RI), and other feedback information may be based on the measurement of the CSI-RS for Release 10 and beyond UEs. The CSI-RS in Release 10 may support up to 8 transmission antennas, while the CRS may support up to 4 transmission antennas in Release 8/9. The number of CSI-RS antenna ports may be 1, 2, 4, or 8. In addition, to support the same number of antenna ports, CSI-RS has a lower overhead due to its low density in time and frequency. In Release 13, beamformed or precoded CSI-RS is introduced, and a UE can be configured to receive one or more precoded CSI-RS and report a CSI with the associated precoded CSI-RS resource index (CRI). In 5G NR, 16 and 32 ports in the CSI-RS are supported.

In standard antenna element to element channel estimation, a channel between two devices is estimated by having a first device transmit a known signal on a known time or frequency resource(s) to a second device, the received signal at the second device is expressible as y=Hs+n, where y is the received signal at the second device, s is the known signal (which may be a reference signal, a pilot, or a pilot signal), H is the channel model or channel response, and n is the noise (and interference for some communication channels). Because s is known by the second device, it is possible for the second device to determine or estimate H from y.

Figure 2:
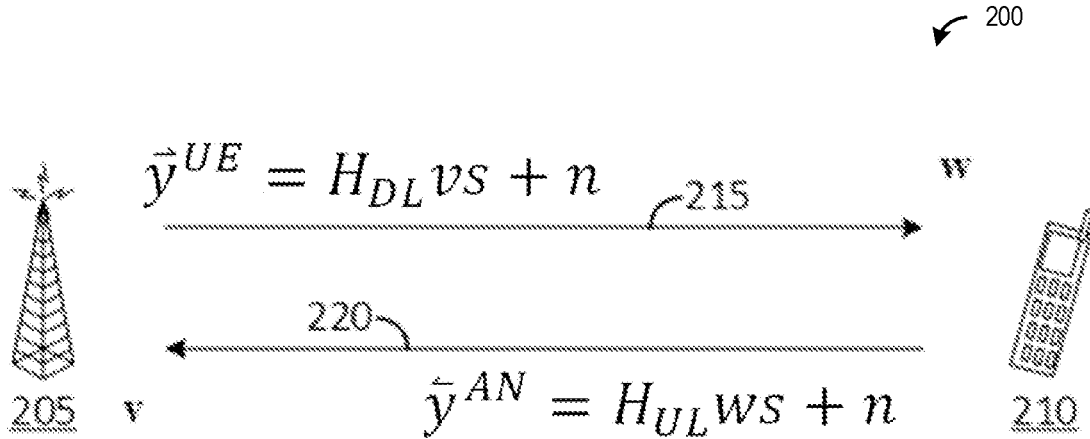
FIG. 2 illustrates an example communications system, providing mathematical expressions of signals transmitted in the communications system.

FIG. 2 illustrates an example communications system 200, providing mathematical expressions of signals transmitted in the communications system. Communications system 200 includes an access node (AN), e.g., a base station, 205, communicating with a UE 210. As shown in FIG. 2, AN 205 is using a spatial transmit filter v and UE 210 is using a spatial transmit filter w. Transmissions from AN 205 may be precoded using the transmit filter v on the multiple transmit antennas of AN 205. Similarly, transmissions from UE 210 may be precoded using the transmit filter w on the multiple transmit antennas of UE 210. As shown in FIG. 2, the downlink channel and the uplink channel between AN 205 and UE 210 may be modeled as $H_{DL}$ and $H_{UL}$, respectively. In a TDD communication system, because of the DL/UL channel reciprocity, the DL channel may be modeled as $H_{DL}=H_{UL}^T$ (which is the transpose of the UL channel model $H_{UL}$). In a FDD communication system, due to the different carrier frequencies used by the DL and the UL, $H_{DL}$ and $H_{UL}^T$ are generally different. However, the channel angle and channel delay of DL and UL are generally the same, i.e., there exists a DL/UL reciprocity of channel angle and channel delay. This reciprocity can be exploited to facilitate enhanced DL MIMO transmissions and to reduce CSI feedback overhead from UE 210.

The filter v or w may be referred to as a precoder. As shown, AN 205 precodes a downlink signal s with the transmit filter v and sends the precoded downlink signal to UE 210. The signal 215 received by UE 210 is expressible as $$\tilde{y}^{UE} = H_{DL}vs + n.$$

Similarly, UL 210 precodes an uplink signal s 220 with the transmit filter w and sends the precoded uplink signal to AN 205. The signal received by AN 205 is expressible as $$\tilde{y}^{AN} = H_{UL}ws + n.$$

UE 210 may send SRSs (e.g., the uplink signal is a SRS transmitted by UE 210) to AN 205 for AN 205 to estimate the uplink channel, i.e., $H_{UL}$. SRSs are signals known at an AN and are transmitted by a UE using time or frequency transmission resources specified by the AN. The AN may analyze received SRS transmission(s) to estimate the uplink channel over a wide bandwidth, and perform communication with the UE in accordance with the uplink channel estimation. This helps improve the performance of communications between the UE sending SRS and the AN. The AN may utilize the SRSs for uplink frequency selective scheduling, uplink timing estimation, and even downlink scheduling and transmission. For example, in a TDD communication system, SRSs may be used to estimate downlink CSI and to facilitate downlink scheduling and transmission via exploitation of DL or UL channel reciprocity. In a FDD communication system, SRSs may also be used to estimate partial DL CSI via exploitation of the DL or UL reciprocity of channel angle and channel delay. The angle and delay information of DL CSI may then be used to facilitate DL MIMO transmissions and to reduce CSI feedback overhead from the communication device.

Conventionally, a AN semi-statically configures the transmission of SRSs for UEs using higher layer signaling, e.g., radio resource control (RRC) signaling. According to 3GPP TS 38.214 V16.1.0 (2020-03), which is hereby incorporated herein by reference in its entirety, a UE may be configured with one or more SRS resource sets by a higher layer parameter SRS-ResourceSet. For aperiodic SRS, at least one state of a DCI field is used to select at least one out of the configured SRS resource set(s). For each SRS resource set, a UE may be configured with K≥1 SRS resources (by a higher layer parameter SRS-Resource), where the maximum value of K is indicated by a parameter SRS_capability. A SRS resource set is generally referred to as a set of SRS resources, while a SRS resource is generally referred to as a SRS signal. The SRS resources in different SRS resource sets can be transmitted simultaneously. Each SRS resource set is associated with a set of SRS parameters, according to which the SRS signals in the SRS resource set are transmitted.

According to 3GPP TS 38.214 V16.1.0 (2020-03), which is hereby incorporated herein by reference in its entirety, the SRS parameters semi-statically configurable by higher layer parameter SRS-Resource include, for example, a srs-ResourceId that determines a SRS resource configuration identity, a number of SRS ports, time domain behavior of SRS resource configuration (e.g., periodic, semi-persistent, aperiodic SRS transmission), slot level periodicity and slot level offset, the number of orthogonal frequency division multiplex (OFDM) symbols in a SRS resource, SRS bandwidth via parameters $B_{SRS}$ and $C_{SRS}$ (refer to TS 38.211 for details), frequency hopping bandwidth $b_{hop}$, cyclic shift, transmission comb, transmission comb offset, SRS sequence ID, and configuration of spatial relation between a reference RS (e.g., an SS/PBCH block, CSI-RS or an SRS configured on the same or different component carrier and/or bandwidth part as the target SRS), and a target SRS. The SRS parameters may be signaled semi-statically to UEs for SRS transmission.

A UE may perform SRS transmission periodically, or aperiodically upon being triggered by an AN using a DCI message. For example, after a UE is configured (semi-statically using higher layer signaling) with one or more SRS resource sets, a DCI message may be sent to the UE to trigger the UE to transmit a triggered SRS resource set (or more generally one or more triggered SRS signal(s)) that has been configured using the higher layer signaling. Conventionally, DCI messages in a DCI format 0_1 (for PUSCH scheduling), a DCI format 1_1 (for PDSCH scheduling), and a DCI format 2_3 (for group SRS power control and triggering) are used for triggering SRS transmission. According to 3GPP TS 38.214 V16.1.0 (2020-03), a DCI message used to trigger SRS transmission includes a SRS request field, which may have 2 bits, for triggering one of multiple pre-configured SRS resource sets to be transmitted.

As mentioned previously, in a FDD communication system, due to the different carrier frequencies used by the DL and the UL, the DL channel and the UL channel are different. However, the channel angle and channel delay of DL and UL are generally the same, i.e., there exists a DL or UL reciprocity of channel angle and channel delay. This reciprocity can be exploited to facilitate enhanced DL MIMO transmissions and to reduce CSI feedback overhead from the UE.

The AN measures UL channel angle and delay based on measurement on SRS. On the angle measurement, because the AN is generally equipped with large number of antennas and can form narrow receiving beams, robust measurement of angle is feasible.

With respect to channel delay measurement, due to the different transmit power on the DL and UL, the UE might need to concentrate its transmit power in a narrow bandwidth of the UL, and utilize frequency hopping to sound the entire sounding bandwidth. Conventionally, with frequency hopping, each hop of the SRS within a hopping cycle covers a different portion of the whole sounding bandwidth, i.e., there is no overlap between the frequency resources used by different hops within a hopping cycle.

Figure 3:
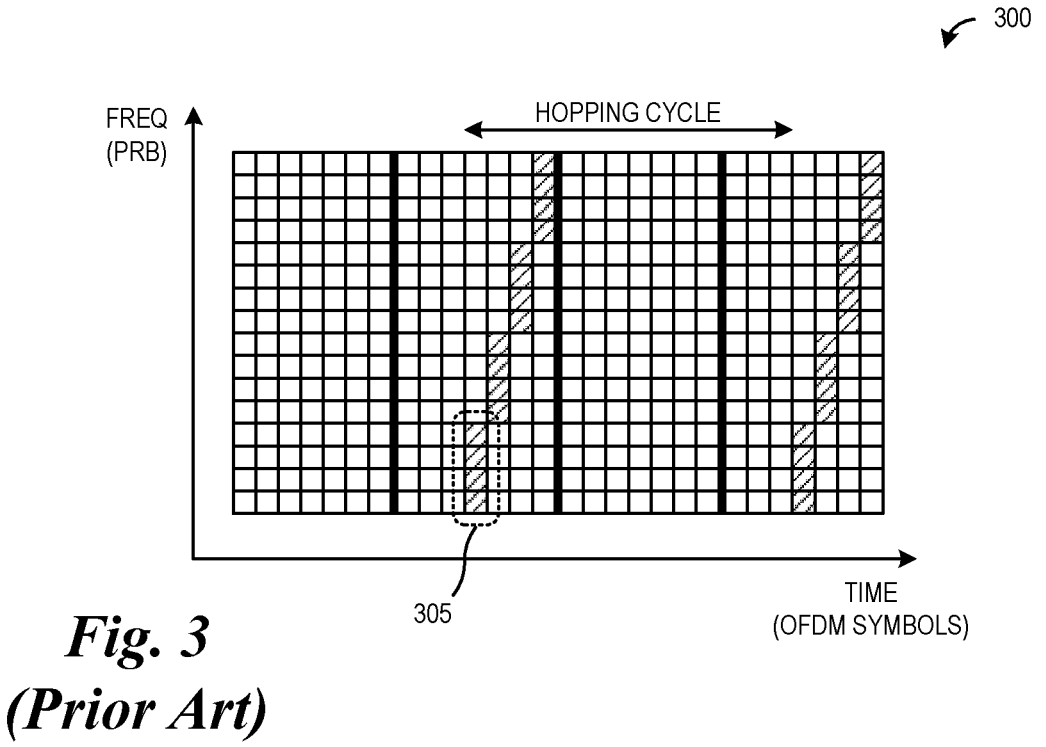
FIG. 3 illustrates a diagram showing examples of prior art SRS transmission with frequency hopping.

FIG. 3 illustrates a diagram 300 showing examples of prior art SRS transmission with frequency hopping. In the example illustrated in FIG. 3, there are four OFDM symbols within a slot allocated for the UE for SRS transmissions (shown as the shaded blocks, such as blocks 305). The whole sounding bandwidth is 16 PRBs, and the bandwidth per hop is 4 PRBs. It is obvious that there is no overlapping between hops, so it will take 4 hops for the SRS to sound the whole sounding bandwidth. The hopping cycle in this example is one slot (e.g., 14 OFDM symbols).

Upon receiving the SRS, the AN may measure the UL frequency domain channel response $H_{UL}$ and may derive the UL time domain channel response $h_{UL}$ according to $H_{UL}$. Once the UL time domain channel response $h_{UL}$ is derived, the AN may estimate the UL channel delay.

For SRS transmissions without frequency hopping, the relationship between $H_{UL}$ and $h_{UL}$ may be expressed as $H_{UL}=Dh_{UL}+N$, where D represents a discrete Fourier transform (DFT) matrix, and N represents interference and noise. In this case, because there is no frequency hopping, $H_{UL}$ is the measurement of the frequency domain channel response over the whole sounding bandwidth, e.g., a wideband channel measurement, and the DFT matrix D is a full length DFT matrix, i.e., the length of each column of D corresponds to the length of $H_{UL}$, which is a wideband channel measurement.

When frequency hopping is utilized, it is possible that a random phase rotation is introduced to each hop of the SRS. In this case, the measurement of the frequency domain channel response over each hop, $\tilde{H}_{UL}$, may be expressed as $\tilde{H}_{UL}=\tilde{D}h_{UL}+\tilde{N}$, where $\tilde{D}$ represents a partial DFT matrix formed by selected rows of the DFT matrix D, where the rows are selected according to the location of the frequency resources of each hop, and $\tilde{N}$ represent the interference and noise over the frequency resources of each hop. The length of each column of $\tilde{D}$ corresponds to the length of $\tilde{H}_{UL}$, which is a narrowband channel measurement over each hop. It is obvious that the length of each column of $\tilde{D}$ is shorter than the length of each column of D. Compared to the case without frequency hopping, the measurements of the frequency domain channel response over each hop cannot be combined directly to form a wideband channel measurement due to the presence of the random phase rotation introduced to each hop of the SRS.

To derive the UL time domain channel response $h_{UL}$ from the UL frequency domain channel response $H_{UL}$, one example method is to use linear minimum mean square error (LMMSE) method. For SRS transmission without frequency hopping, $h_{UL}$ can be estimated as $$h_{UL} = E(h_{UL}H_{UL}^H)\{E(H_{UL}H_{UL}^H)\}^{-1}H_{UL} \Rightarrow \qquad \text{Equation (1)}$$

$$h_{UL} = E(h_{UL}h_{UL}^H)D^H\{DE(h_{UL}h_{UL}^H)D^H + \sigma^2 I\}^{-1}H_{UL} \Rightarrow$$

$$h_{UL} = D^H\{DD^H + \sigma^2 I\}^{-1}H_{UL}$$

In the equations above, $\sigma^2$ is the variance of the interference and noise N, and "$\Rightarrow$" indicates the equation on its left can be further converted or simplified to the equation below.

Similarly, for SRS transmission with frequency hopping, $h_{UL}$ can be estimated as $$h_{UL} = E(h_{UL}\tilde{H}_{UL}^H)\{E(\tilde{H}_{UL}\tilde{H}_{UL}^H)\}^{-1}\tilde{H}_{UL} \Rightarrow \qquad \text{Equation (2)}$$

$$h_{UL} = E(h_{UL}h_{UL}^H)\tilde{D}^H\{\tilde{D}E(h_{UL}h_{UL}^H)\tilde{D}^H + \sigma^2 I\}^{-1}\tilde{H}_{UL} \Rightarrow$$

$$h_{UL} = \tilde{D}^H\{\tilde{D}\tilde{D}^H + \sigma^2 I\}^{-1}\tilde{H}_{UL}$$

Comparing Equation (2) with Equation (1), it is observed that for the case with frequency hopping, the partial DFT matrix $\tilde{D}$ has to be used in the LMMSE method, while for the case without frequency hopping, the full length DFT matrix D is used. For the full length DFT matrix D, its columns are orthogonal to each other, while for the partial DFT matrix $\tilde{D}$, its columns are no longer orthogonal to each other because each of its columns is just a fraction of its corresponding column in the full length DFT matrix D. So comparing the cases with frequency hopping to the case without frequency hopping, the performance loss from using the per hop measurement $\tilde{H}_{UL}$ to estimate $h_{UL}$ is twofold: 1) loss of energy because channel measurement over each hop cannot be directly combined together, and 2) loss of orthogonality because the columns of the partial DFT matrix $\tilde{D}$ are no longer orthogonal, both caused by the fact that the wideband channel measurement is not available due to the random phase rotation introduced in each hop of the SRS transmission. It is therefore beneficial to enhance the SRS transmission with frequency hopping to enable the AN to reconstruct wideband channel measurement in case of random phase rotation introduced in each hop.

Embodiments of the present disclosure provide methods and apparatus for enhanced SRS frequency hopping transmission with partial frequency resources overlap. In an embodiment, the UE transmits to the AN a SRS with frequency hopping on a first hop at a first set of frequency resources. The UE may later transmit to the AN a second hop at a second set of frequency resources. There is a partial overlap between the first set of frequency resources and the second set of frequency resources if the two sets are adjacent to each other. This partial overlap of frequency resources enables the AN to estimate the phase difference of the random phase rotation over each hop. The estimating of the phase difference of the random phase rotation is achieved by the AN performing measurements of the SRS over the overlapping frequency resources, and assuming that the phase of the measured channel response should have been equal over the overlapping portion of two different hops. The measured phase difference over the overlapping portion of two different hops may then be used as the phase difference of the random phase rotation over the two different hops. The AN may then rotate back the random phase differences among hops, and combine the channel measurement over each hop into a wideband channel measurement. The AN may use the wideband channel measurement to have a robust estimation of the channel delays. The channel delay information may then be utilized by the AN to facilitate enhanced DL MIMO transmissions and to reduce CSI feedback overhead from the UE.

In an embodiment, the size of the overlapping frequency resources may be indicated from the AN to the UE in an RRC message, a MAC CE, or a DCI message. The size of the overlapping frequency resources is at least a PRB, e.g., an integer multiple of PRBs. After receiving the indication of the size of the overlapping frequency resources, the UE may then decide the frequency domain starting position of each hop over time accordingly. The UE may then transmit the SRSs according to the frequency domain starting position of each hop.

Figure 4:
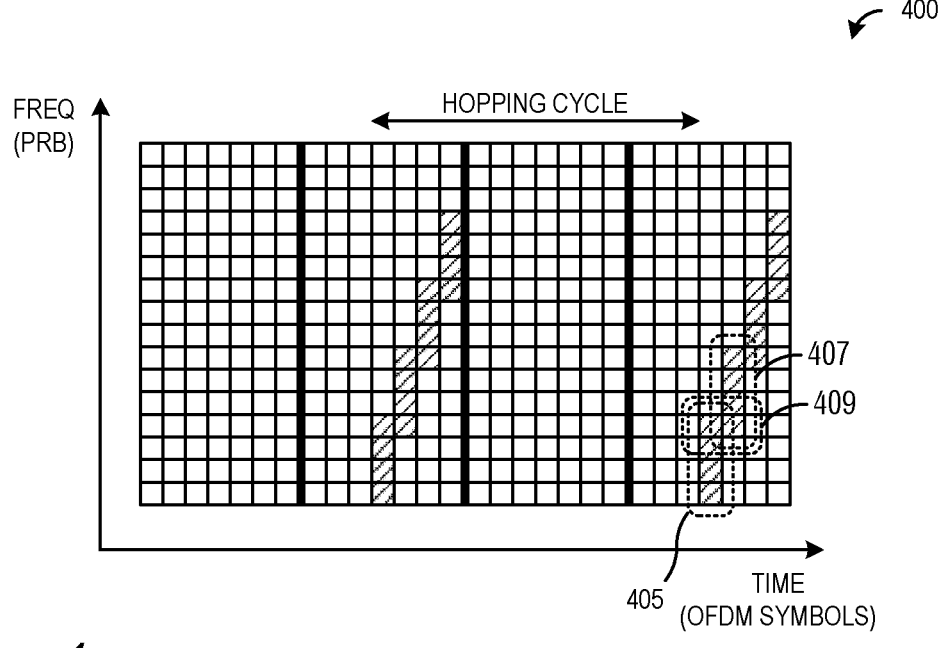
FIG. 4 illustrates a diagram showing examples of enhanced SRS frequency hopping transmission with partial frequency resources overlapping.

FIG. 4 illustrates a diagram 400 showing examples of enhanced SRS frequency hopping transmission with partial frequency resources overlapping. As shown in FIG. 4, there are four OFDM symbols within a slot allocated for the UE for SRS transmissions. The whole sounding bandwidth is 16 PRBs, and the bandwidth per hop is 4 PRBs. Different from the example of existing SRS transmission with frequency hopping illustrated in FIG. 3, there is an overlap of frequency resources between hops in adjacent frequency locations.

In this example, the size of the overlapping frequency resources is one PRB. Other sizes are possible and may be signaled to the UE by the AN. In the first hop at the first OFDM symbol allocated for the UE for SRS transmissions, the frequency domain starting position is at the boundary of the bandwidth per hop, e.g., boundary of every 4 PRBs. This is the same as the one in the example shown in FIG. 3. Blocks 405 highlight 4 first PRBs allocated for SRS transmission in a first hop. In the second hop at the second OFDM symbol allocated for the UE for SRS transmissions, the frequency domain starting position is adjusted according to the size of the overlapping frequency resources. Blocks 407 highlight 4 second PRBs allocated for SRS transmission in a second hop. The frequency domain starting position of the second hop is shifted downward (e.g., to a lower frequency) by one PRB, which is the size of the overlapping frequency resources, from the boundary of the bandwidth per hop, e.g., boundary of every 4 PRBs. With the adjusted frequency domain starting position, the second hop has, in frequency domain, an overlap of a size of one PRB with the first hop. There is an overlap in the frequency resources allocated in the first and second hops, which is shown as overlap 409. There are similar overlaps present for other hops shown in FIG. 4.

Similarly, in the third hop at the third OFDM symbol allocated for the UE for SRS transmissions, the frequency domain starting position is adjusted according to the size of the overlapping frequency resources. The frequency domain starting position is shifted downward by two PRBs from the boundary of the bandwidth per hop, e.g., boundary of every 4 PRBs, such that the third hop has an overlap of a size of one PRB with the second hop. Similarly, in the fourth hop at the fourth OFDM symbol allocated for the UE for SRS transmissions, the frequency domain starting position is adjusted according to the size of the overlapping frequency resources. The frequency domain starting position is shifted downward by three PRBs from the boundary of the bandwidth per hop, e.g., boundary of every 4 PRBs, such that the fourth hop has an overlap of a size of one PRB with the third hop. The hopping pattern may then repeat in the next hopping cycle if the SRS transmission is configured as periodic, or semi-persistent and is activated. In this example illustrated in FIG. 4, the UE sends a first SRS transmission spanning a first set of resources, the UE then send a second SRS transmission spanning a second set of resources, wherein a subset of the second set of resources overlap with the first set of resources, i.e., the second set of resources partially overlaps with the first set of resources.

The example illustrated in FIG. 4 represents a case for SRS transmission with intra-slot frequency hopping without repetition for a single antenna port. According to some embodiments, for SRS transmission with inter-slot frequency hopping, the same method as illustrated in FIG. 4 may be used, i.e., the frequency domain starting position of each hop in a new slot may be adjusted according to the size of the overlapping frequency resources.

According to some embodiments, for SRS transmission with repetition, the same method as illustrated in FIG. 4 may also be used. For example, within each hop, there may be a repetition of SRS transmissions, after the repetition, the frequency domain starting position of a new hop may be adjusted according to the size of the overlapping frequency resources.

According to some embodiments, for SRS transmission with multiple antenna ports, the same method as illustrated in FIG. 4 may also be used. For example, within each hop, there may be SRS transmissions for different antenna ports, after the transmissions, the frequency domain starting position of a new hop may be adjusted according to the size of the overlapping frequency resources.

It is possible that the SRS transmission is configured with a combination of one or more different settings of intra-slot frequency hopping, inter-slot frequency hopping, no repetition, with repetition, single antenna port, multiple antenna ports, or other settings. According to some embodiments, in that case, a similar method according to the principle illustrated in FIG. 4 may be used, e.g., the frequency domain starting position of a new hop may be adjusted according to the size of the overlapping frequency resources.

Figure 5:
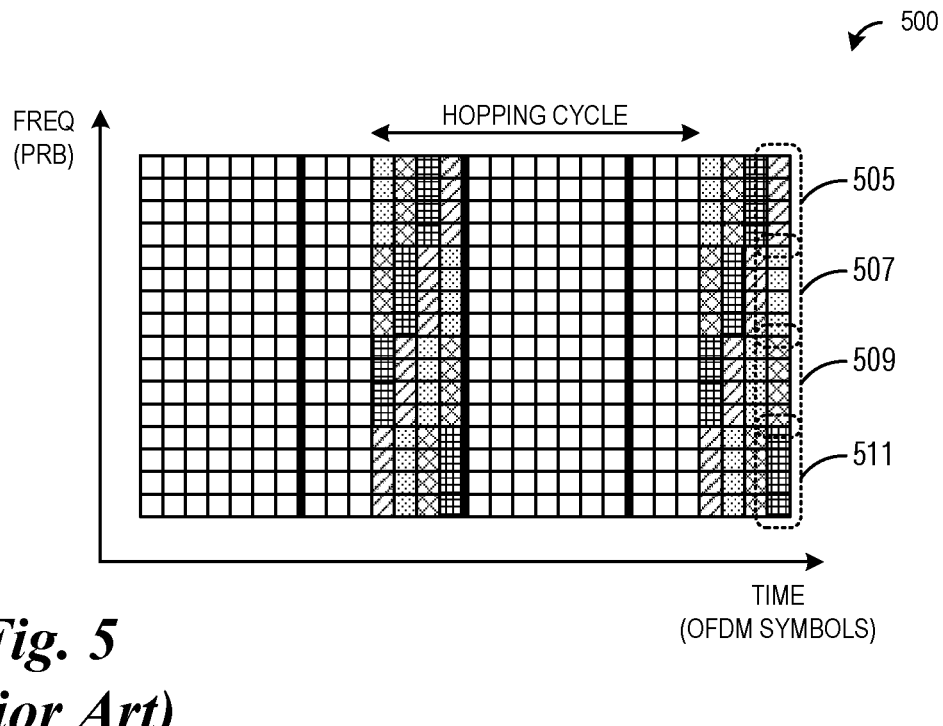
FIG. 5 illustrates a diagram showing examples of prior art SRS transmissions with frequency hopping from multiple UEs.

FIG. 5 illustrates a diagram 500 showing examples of prior art SRS transmissions with frequency hopping from multiple UEs. In the example illustrated in FIG. 5, there are four UEs which are allocated resources for SRS transmission. In FIG. 5, the frequency resources with different colors or shades are allocated for different UEs. In this example, there are four OFDM symbols within a slot allocated for the four UEs for SRS transmissions. The whole sounding bandwidth is 16 PRBs, and the bandwidth per hop is 4 PRBs. As shown in FIG. 5, blocks 505 represent PRBs allocated to a first UE, blocks 507 represent PRBs allocated to a second UE, blocks 509 represent PRBs allocated to a third UE, and blocks 511 represent PRBs allocated to a fourth UE. There is no overlapping between hops, so it will take 4 hops for the SRS of each UE to sound the whole sounding bandwidth. The hopping cycle in this example is one slot (e.g., 14 OFDM symbols).

Figure 6A:
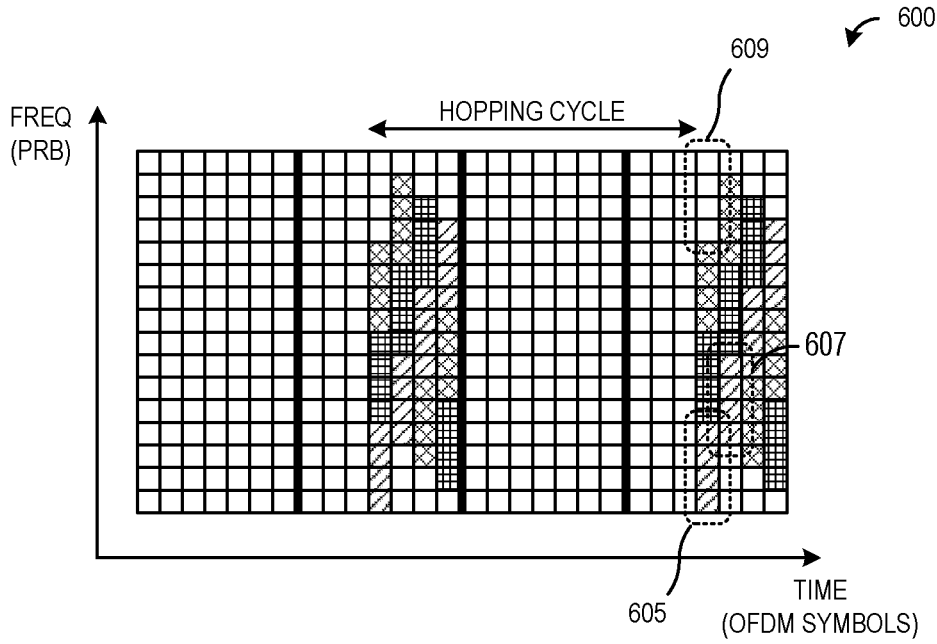
FIG. 6A illustrates a diagram of examples of a first enhanced SRS frequency hopping transmission from multiple UEs, with partial frequency resources overlapping between hops of each UE according to example embodiments presented herein.

FIG. 6A illustrates a diagram 600 of examples of a first enhanced SRS frequency hopping transmission from multiple UEs, with partial frequency resources overlapping between hops of each UE. In the example illustrated in FIG. 6A, there are three UEs which are allocated resources for SRS transmission. In FIG. 6A, the frequency resources with different colors or shades are allocated for different UEs. In this example, there are four OFDM symbols within a slot allocated for the three UEs for SRS transmissions. The whole sounding bandwidth is 16 PRBs, and the bandwidth per hop is 4 PRBs. As an example, blocks 605 represent 4 first PRBs allocated to a first UE for SRS transmission in a first hop, and blocks 607 represent 4 second PRBs allocated to the first UE for SRS transmission in a second hop. There is an overlap present in the PRBs between the first and second hops. As illustrated in FIG. 6A, due to the adjustment of the frequency domain starting position of a new hop according to the size of the overlapping frequency resources, some of the frequency resources allocated for SRS transmissions are left unused to avoid collision among different users. Blocks 609 represent PRBs left unused to avoid collision among different UEs.

Figure 6B:
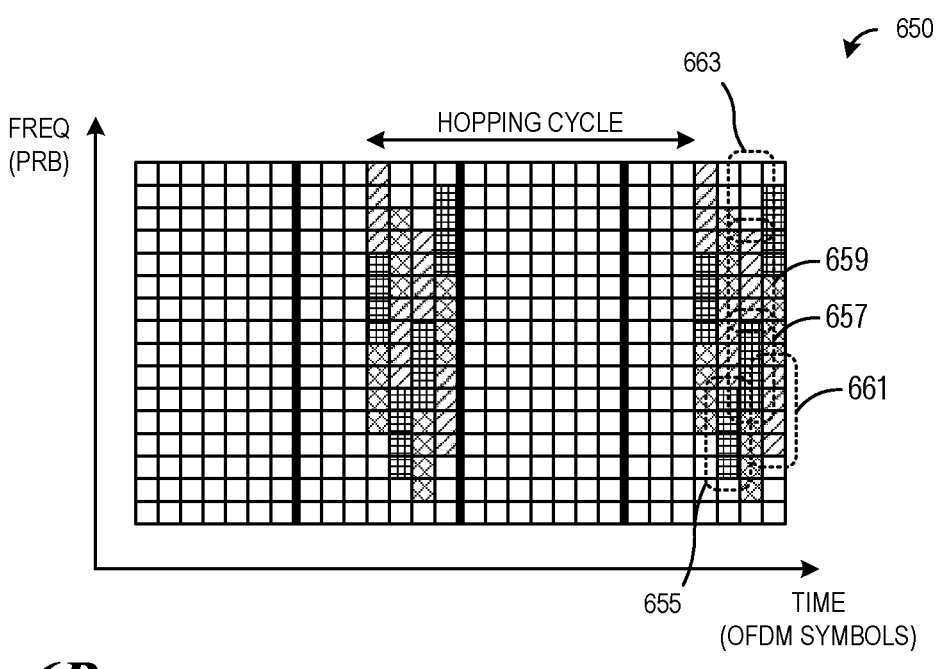
FIG. 6B illustrates a diagram of examples of a second enhanced SRS frequency hopping transmission from multiple UEs, with partial frequency resources overlapping between hops of each UE according to example embodiments presented herein.

FIG. 6B illustrates a diagram 650 of examples of a second enhanced SRS frequency hopping transmission from multiple UEs, with partial frequency resources overlapping between hops of each UE. In the example illustrated in FIG. 6B, there are three UEs which are allocated resources for SRS transmission. In FIG. 6B, the frequency resources with different colors or shades are allocated for different UEs. Similar to the example illustrated in FIG. 6A, there are four OFDM symbols within a slot allocated for the three UEs for SRS transmissions, the whole sounding bandwidth is 16 PRBs, and the bandwidth per hop is 4 PRBs. Different from the example illustrated in FIG. 6A, in the example shown in FIG. 6B, the three UEs use different frequency hopping patterns, and the adjustments of the frequency domain starting position of new hops according to the size of the overlapping frequency resources are also different. As an example, blocks 655 represent 4 first PRBs allocated to a first UE for SRS transmission in a second hop and blocks 657 represent 4 second PRBs allocated to the first UE for SRS transmission in a third hop. As shown, there is an overlap in the resources of block 655 and 657. As another example, blocks 659 represent 4 third PRBs allocated to a second UE for SRS transmission in a third hop and blocks 661 represent 4 first PRBs allocated to the second UE for SRS transmission in a fourth hop. As shown, there is no overlap in the resources of blocks 659 and 661. As illustrated in FIG. 6B, due to the adjustment of the frequency domain starting position of a new hop according to the size of the overlapping frequency resources, some of the frequency resources allocated for SRS transmissions are left unused to avoid collision among different users. Blocks 663 represent PRBs left unused to avoid collision among different UEs.

Figure 7:
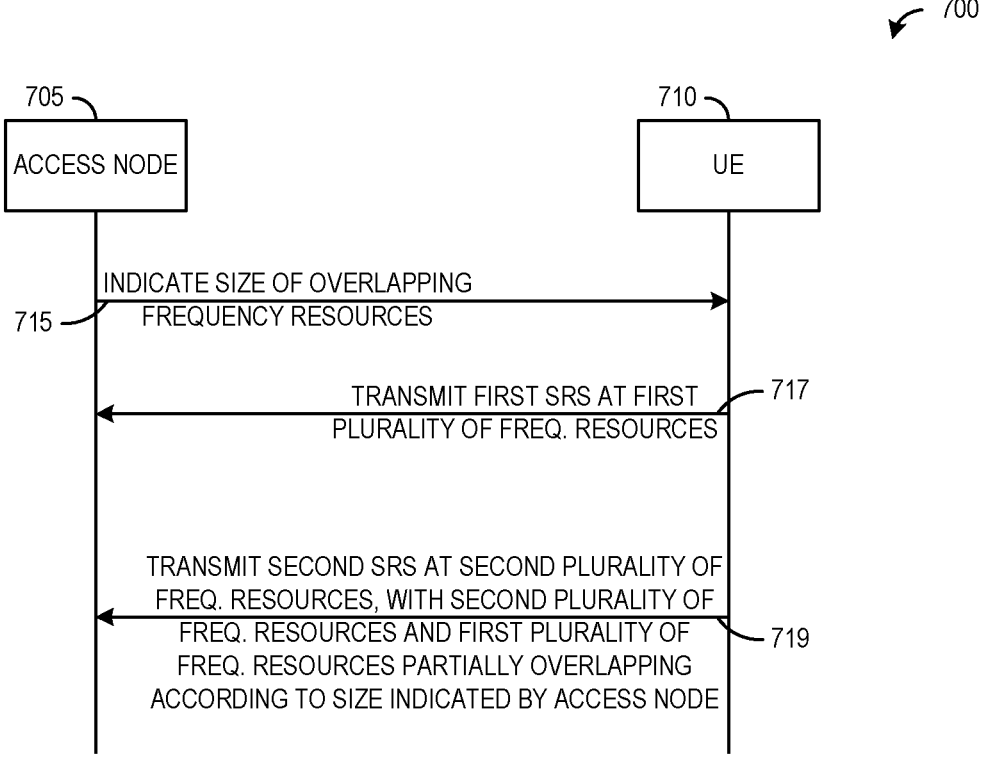
FIG. 7 illustrates a diagram of communications exchanged between devices participating in enhanced SRS frequency hopping transmission with partial frequency resources overlapping according to example embodiments presented herein.

FIG. 7 illustrates a diagram 700 of communications exchanged between devices participating in enhanced SRS frequency hopping transmission with partial frequency resources overlapping. The devices participating in enhanced SRS frequency hopping transmission with partial frequency resources overlapping include AN 705 and UE 710.

Access node 705 configures SRS frequency hopping transmission with partial frequency resource overlapping for UE 710. The configuration of the SRS frequency hopping transmission includes the size of the overlapping resources. Access node 705 indicates to UE 710 the size of overlapping frequency resources (event 715). For example, access node 705 may indicate the size of the overlapping frequency resources in a RRC signaling. In another example, access node 705 may indicate the size of the overlapping frequency resources in a MAC CE signaling. In yet another example, access node 705 may indicate the size of the overlapping frequency resources in a DCI message. UE 710 transmits SRSs based on the configuration. As an example, UE 710 transmits a first SRS at a first plurality of frequency resources (event 717) and transmits a second SRS at a second plurality of frequency resources (event 719). The second plurality of frequency resources partially overlaps with the first plurality of frequency resources according to the size of the overlapping resources, as indicated by access node 705.

In one embodiment, the size of the overlapping frequency resources is at least a PRB. For example, the size of the overlapping frequency resources is an integer multiple of PRBs. This will simplify system design and implementation because many of the system design considerations, such as SRS comb spacing and SRS sequence design, etc., are based on the assumption of SRS transmissions occurring within PRB boundaries. However, if overhead of the overlapping frequency resources is more of a concern than complexity of system design and implementation, the size of the overlapping frequency resources may be different from an integer multiple of a PRB, e.g., a fraction of a PRB, such as in the unit of a subcarrier.

In another embodiment, the number of the possible sizes of the overlapping frequency resources is just one. In this case, one bit may be sufficient to indicate two possible states: frequency hopping without overlapping frequency resources, and frequency hopping with partial overlapping frequency resources. The size of the overlapping frequency resources may be predefined, e.g., in a standard, specified by the operator of the communication system, etc., and is known to both AN 705 and UE 710. For example, the size of the overlapping frequency resources is defined as one PRB, then a bit "0" may indicate that there is no overlapping for frequency hopping, and a bit "1" may indicate that the size of the overlapping frequency resources is one PRB. An alternate mapping of the bit values is possible.

In yet another embodiment, the number of the possible sizes of the overlapping frequency resources may be more than one. In this case, more than one bit may be needed to indicate the size of the overlapping frequency resources. The possible sizes of the overlapping frequency resources may be predefined, e.g., in a standard, specified by the operator of the communication system, etc., and are known to both AN 705 and UE 710. For example, there are two possible sizes of the overlapping frequency resources: one PRB and two PRBs. In such a deployment, a two-bit field with value "00" may indicate that there is no overlapping for frequency hopping, a two-bit field with value "01" may indicate that the size of the overlapping frequency resources is one PRB, a two-bit field with value "10: may indicate that the size of the overlapping frequency resources is two PRBs, and a two-bit field with value "11" may be reserved for subsequent use or indicate that the size of the overlapping frequency resources is three (or some previously undefined value) PRBs. Different mappings from the value of the multiple bit field to the size of the overlapping frequency resources are possible.

According to 3GPP TS 38.331 V16.0.0 (2020-03), an SRS resource is configured by the SRS-Config information element (IE), which is part of the RRC signalling. A portion of the fields included in the SRS-Config IE is illustrated below:

```
SRS-Resource ::=                SEQUENCE {
            srs-ResourceId                   SRS-ResourceId,
            ...,
    freqDomainPosition          INTEGER (0..67),
    freqDomainShift             INTEGER (0..268),
    freqHopping                 SEQUENCE {
        c-SRS                       INTEGER (0..63),
        b-SRS                       INTEGER (0..3),
        b-hop                       INTEGER (0..3)
    },
    ...
}
```

In one embodiment, the indication of the size of the overlapping frequency resources may be signaled as a new field referred to as "reoviral" in the SRS-Config 1E. In one example, the new field may be a one-bit field as illustrated below, e.g., a bit "o" may indicate that there is no overlapping for frequency hopping, and a bit "1" may indicate that the size of the overlapping frequency resources is a predefined number of PRBs (e.g., one PRB):

```
SRS-Resource ::=                SEQUENCE {
    srs-ResourceId                  SRS-ResourceId,
    ...,
    freqDomainPosition          INTEGER (0..67),
    freqDomainShift             INTEGER (0..268),
    freqHopping                 SEQUENCE {
        c-SRS                       INTEGER (0..63),
        b-SRS                       INTEGER (0..3),
        b-hop                       INTEGER (0..3)
        freqOverlap                 INTEGER (0..1)
    },
    ...
}
```

In another embodiment, the new field referred to as "freqOverlap" is a multiple-bit field (e.g., 2-bit field) as illustrated below, where a two-bit field with value "00" may indicate that there is no overlapping for frequency hopping, a two-bit field with value "01" may indicate that the size of the overlapping frequency resources is one PRB, a two-bit field with value "10" may indicate that the size of the overlapping frequency resources is two PRBs, and a two-bit field with value "11" may be reserved or indicate that the size of the overlapping frequency resources is three (or some previously undefined value) PRBs:

```
SRS-Resource ::=                SEQUENCE {
    srs-ResourceId                  SRS-ResourceId,
    ...,
    freqDomainPosition          INTEGER (0..67),
    freqDomainShift             INTEGER (0..268),
    freqHopping                 SEQUENCE {
        c-SRS                       INTEGER (0..63),
        b-SRS                       INTEGER (0..3),
        b-hop                       INTEGER (0..3)
        freqOverlap                 INTEGER (0..3)
    },
    ...
}
```

After event 715, UE 710 may, at event 717, transmit a first SRS at a first plurality of frequency resources. The frequency domain starting position of the first SRS may not require adjustment, e.g., the starting PRB of the first SRS is aligned with the boundary of the bandwidth per hop. After event 717, UE 710 may, at event 719, transmit a second SRS at a second plurality of frequency resources at a second time, wherein the second plurality of frequency resources and the first plurality of frequency resources partially overlap. The size of the overlapping frequency resources is set according to the size indicated by AN 705 at event 715 (e.g., by the field "freqOverlap" in the SRS-Config 1E). This is achieved by UE 710 adjusting the frequency domain starting position of the second SRS according to the size indicated by AN 705 at event 715, for example. In one example, UE 710 may shift the frequency domain starting position of the second SRS, e.g., the starting PRB of the second SRS, from the boundary of the bandwidth per hop, to a lower frequency by the amount of $S_{Overlap} \cdot i_{hop}$, where $S_{Overlap}$ is the size of the overlapping frequency resources indicated by AN 705 at event 715, and $i_{hop}$ is the index of each hop within a hopping cycle, with the index of the first hop set to 0, the index of the second hop set to 1, and so on, and the index of the first hop in a new hopping cycle reset back to 0.

In another example, UE 710 may shift the frequency domain starting position of each hop from the boundary of the bandwidth per hop, to a lower frequency by the amount of $S_{Overlap} \cdot \text{ShiftID}(i_{hop})$, where $S_{Overlap}$ is the size of the overlapping frequency resources indicated by AN 705 at step 715 (e.g., by the field "freqOverlap" in the SRS-Config 1E), and $i_{hop}$ is the index of each hop within a hopping cycle, with the index of the first hop set to 0, the index of the second hop set to 1, and so on, and the index of the first hop in a new hopping cycle reset back to 0, and $\text{ShiftID}(i_{hop})$ is a function that maps the index of each hop $i_{hop}$ to a shift index of each hop. For example, in the example illustrated in FIG. 6B, ShiftID(0)=0, ShiftID(1)=2, ShiftID(2)=3, ShiftID(3)=1, that is, the frequency domain starting position of the first hop, the second hop, the third hop, and the fourth hop are shifts from the boundary of the bandwidth per hop to a lower frequency by the amount of 0 PRB, 2 PRBs, 3 PRBs, and one PRB, respectively. With $\text{ShiftID}(i_{hop})$, the amount of the frequency to be shifted from the boundary of the bandwidth per hop for each hop may be arranged to support different hopping patterns, e.g., the amount of the frequency to be shifted does not need to grow (or shrink) as the index of each hop increases. It is observed that the method and apparatus to obtain the amount of the frequency to be shifted in the previous example, e.g., according to $S_{Overlap} \cdot i_{hop}$, is a special case of the method and apparatus according to $S_{Overlap} \cdot \text{ShiftID}(\text{Inop})$, with ShiftID(0)=0, ShiftID(1)=1, ShiftID(2)=2, and ShiftID(3)=3.

$$k_0^{(p_i)} = \bar{k}_0^{(p_i)} + \sum_{b=0}^{B_{SRS}} K_{TC} M_{sc,b}^{SRS} n_b k_0^{(p_i)} =$$
$$\bar{k}_0^{(p_i)} + \sum_{b=0}^{B_{SRS}} K_{TC} M_{sc,b}^{SRS} n_b - N_{sc}^{RB} S_{Overlap} i_{hop} N_{sc}^{RB} S_{Overlap} i_{hop} i_{hop} =$$
$$n_{SRS} \bmod \prod_{b'=b_{hop}}^{b} N_{b'} i_{hop} n_{SRS} \prod_{b'=b_{hop}}^{b} N_{b'}$$

According to 3GPP TS 38.211 V16.1.0 (2020-03), the frequency domain starting position of the SRS is defined by $$k_0^{(p_i)} = \bar{k}_0^{(p_i)} + \sum_{b=0}^{B_{SRS}} K_{TC} M_{sc,b}^{SRS} n_b k_0^{(p_i)} =$$
$$\bar{k}_0^{(p_i)} + \sum_{b=0}^{B_{SRS}} K_{TC} M_{sc,b}^{SRS} n_b - N_{sc}^{RB} S_{Overlap} i_{hop} N_{sc}^{RB} S_{Overlap} i_{hop} i_{hop} =$$
$$n_{SRS} \bmod \prod_{b'=b_{hop}}^{b} N_{b'} i_{hop} n_{SRS} \prod_{b'=b_{hop}}^{b} N_{b'}$$

where the detailed definition of each term in the equation above can be found in 3GPP TS 38.211 V16.1.0 (2020-03). In one embodiment, the equation above may be modified to represent the frequency domain starting position of the SRS after being adjusted according to the size indicated by AN 705 at event 715. The amount of the frequency shift from the boundary of the bandwidth per hop for each hop may be applied to the equation above to adjust the frequency domain starting position of the SRS. In one example, the frequency domain starting position of the SRS may be expressed as $$k_0^{(p_i)} = \bar{k}_0^{(p_i)} + \sum_{b=0}^{B_{SRS}} K_{TC} M_{sc,b}^{SRS} n_b k_0^{(p_i)} =$$
$$\bar{k}_0^{(p_i)} + \sum_{b=0}^{B_{SRS}} K_{TC} M_{sc,b}^{SRS} n_b - N_{sc}^{RB} S_{Overlap} i_{hop} N_{sc}^{RB} S_{Overlap} i_{hop} i_{hop} =$$
$$n_{SRS} \bmod \prod_{b'=b_{hop}}^{b} N_{b'} i_{hop} n_{SRS} \prod_{b'=b_{hop}}^{b} N_{b'}$$

where is the number of subcarriers per resource block, is the size of the overlapping frequency resources indicated by AN 705 at event 715 (e.g., by the field "freqOverlap" in the SRS-Config 1E), and is the index of each hop within a hopping cycle and can be expressed as $$k_0^{(p_i)} = \bar{k}_0^{(p_i)} + \sum_{b=0}^{B_{SRS}} K_{TC} M_{sc,b}^{SRS} n_b k_0^{(p_i)} =$$
$$\bar{k}_0^{(p_i)} + \sum_{b=0}^{B_{SRS}} K_{TC} M_{sc,b}^{SRS} n_b - N_{sc}^{RB} S_{Overlap} i_{hop} N_{sc}^{RB} S_{Overlap} i_{hop} i_{hop} =$$
$$n_{SRS} \bmod \prod_{b'=b_{hop}}^{b} N_{b'} i_{hop} n_{SRS} \prod_{b'=b_{hop}}^{b} N_{b'}$$

where the detailed definition of each term (except) in the equation above can be found in 3GPP TS 38.211 V16.1.0 (2020-03). Specifically, is a counter that counts the number of SRS transmissions, and the term is effectively the hoping cycle. In this example, AN 705 may select and indicate to UE 710 a higher-layer parameter, $n_{RRC}$ which is defined as the higher-layer parameter freqDomainPosition in 3GPP TS 38.211 V16.1.0 (2020-03), such that the frequency hopping of the SRS transmission stays in the whole SRS sounding bandwidth and there is no collision among multiple UEs' SRS transmissions.

$$k_0^{(p_i)} = \bar{k}_0^{(p_i)} + \sum_{b=0}^{B_{SRS}} K_{TC} M_{sc,b}^{SRS} n_b k_0^{(p_i)} =$$
$$\bar{k}_0^{(p_i)} + \sum_{b=0}^{B_{SRS}} K_{TC} M_{sc,b}^{SRS} n_b - N_{sc}^{RB} S_{Overlap} i_{hop} N_{sc}^{RB} S_{Overlap} i_{hop} i_{hop} =$$
$$n_{SRS} \bmod \prod_{b'=b_{hop}}^{b} N_{b'} i_{hop} n_{SRS} \prod_{b'=b_{hop}}^{b} N_{b'}$$

$$k_0^{(p_i)} = \bar{k}_0^{(p_i)} + \sum_{b=0}^{B_{SRS}} K_{TC} M_{sc,b}^{SRS} n_b k_0^{(p_i)} =$$
$$\bar{k}_0^{(p_i)} + \sum_{b=0}^{B_{SRS}} K_{TC} M_{sc,b}^{SRS} n_b - N_{sc}^{RB} S_{Overlap} i_{hop} N_{sc}^{RB} S_{Overlap} i_{hop} i_{hop} =$$
$$n_{SRS} \bmod \prod_{b'=b_{hop}}^{b} N_{b'} i_{hop} n_{SRS} \prod_{b'=b_{hop}}^{b} N_{b'}$$

$$k_0^{(p_i)} = \bar{k}_0^{(p_i)} + \sum_{b=0}^{B_{SRS}} K_{TC} M_{sc,b}^{SRS} n_b k_0^{(p_i)} =$$
$$\bar{k}_0^{(p_i)} + \sum_{b=0}^{B_{SRS}} K_{TC} M_{sc,b}^{SRS} n_b - N_{sc}^{RB} S_{Overlap} i_{hop} N_{sc}^{RB} S_{Overlap} i_{hop} i_{hop} =$$
$$n_{SRS} \bmod \prod_{b'=b_{hop}}^{b} N_{b'} i_{hop} n_{SRS} \prod_{b'=b_{hop}}^{b} N_{b'}$$

$$k_0^{(p_i)} = \bar{k}_0^{(p_i)} + \sum_{b=0}^{B_{SRS}} K_{TC} M_{sc,b}^{SRS} n_b -$$
$$N_{sc}^{RB} S_{Overlap} \text{ShiftID}(i_{hop}) N_{sc}^{RB} S_{Overlap} \text{ShiftID}(i_{hop}) i_{hop} i_{hop} i_{hop} =$$

-continued $$n_{SRS} \bmod \prod_{b'=b_{hop}}^{b} N_{b'} i_{hop} n_{SRS} \prod_{b'=b_{hop}}^{b} N_{b'}$$

In another example, the frequency domain starting position of the SRS may be expressed as $$k_0^{(p_i)} = \bar{k}_0^{(p_i)} + \sum_{b=0}^{B_{SRS}} K_{TC} M_{sc,b}^{SRS} n_b -$$

$$N_{sc}^{RB} S_{Overlap} ShiftID(i_{hop}) N_{sc}^{RB} S_{Overlap} ShiftID(i_{hop}) i_{hop} i_{hop} i_{hop} =$$

$$n_{SRS} \bmod \prod_{b'=b_{hop}}^{b} N_{b'} i_{hop} n_{SRS} \prod_{b'=b_{hop}}^{b} N_{b'}$$

where is the number of subcarriers per resource block, is the size of the overlapping frequency resources indicated by AN 705 at event 715 (e.g., by the field "freqOverlap" in the SRS-Config 1E), is a function that maps the index of each hop to a shift index of each hop, and is the index of each hop within a hopping cycle and can be expressed as $$k_0^{(p_i)} = \bar{k}_0^{(p_i)} + \sum_{b=0}^{B_{SRS}} K_{TC} M_{sc,b}^{SRS} n_b -$$

$$N_{sc}^{RB} S_{Overlap} ShiftID(i_{hop}) N_{sc}^{RB} S_{Overlap} ShiftID(i_{hop}) i_{hop} i_{hop} i_{hop} =$$

$$n_{SRS} \bmod \prod_{b'=b_{hop}}^{b} N_{b'} i_{hop} n_{SRS} \prod_{b'=b_{hop}}^{b} N_{b'}$$

where the detailed definition of each term (except) in the equation above can be found in 3GPP TS 38.211 V16.1.0 (2020-03). Specifically, is a counter that counts the number of SRS transmissions, and the term is effectively the hoping cycle. In this example, AN 705 may select and indicate to UE 710 a higher-layer parameter, $n_{RRC}$ which is defined as the higher-layer parameter freqDomainPosition in 3GPP TS 38.211 V16.1.0 (2020-03), such that the frequency hopping of the SRS transmission stays in the whole SRS sounding bandwidth and there is no collision among multiple UEs' SRS transmissions.

$$k_0^{(p_i)} = \bar{k}_0^{(p_i)} + \sum_{b=0}^{B_{SRS}} K_{TC} M_{sc,b}^{SRS} n_b -$$

$$N_{sc}^{RB} S_{Overlap} ShiftID(i_{hop}) N_{sc}^{RB} S_{Overlap} ShiftID(i_{hop}) i_{hop} i_{hop} i_{hop} =$$

$$n_{SRS} \bmod \prod_{b'=b_{hop}}^{b} N_{b'} i_{hop} n_{SRS} \prod_{b'=b_{hop}}^{b} N_{b'}$$

$$k_0^{(p_i)} = \bar{k}_0^{(p_i)} + \sum_{b=0}^{B_{SRS}} K_{TC} M_{sc,b}^{SRS} n_b -$$

$$N_{sc}^{RB} S_{Overlap} ShiftID(i_{hop}) N_{sc}^{RB} S_{Overlap} ShiftID(i_{hop}) i_{hop} i_{hop} i_{hop} =$$

$$n_{SRS} \bmod \prod_{b'=b_{hop}}^{b} N_{b'} i_{hop} n_{SRS} \prod_{b'=b_{hop}}^{b} N_{b'}$$

The partially overlapping frequency resources enable AN 705 to estimate the phase difference of the random phase rotation over each hop, rotate back the random phase difference among hops, and combine the channel measurement over each hop into a wideband channel measurement. AN 705 may use the wideband channel measurement to have a robust estimation of the channel delays. The channel delay information may then be utilized by AN 705 to facilitate enhanced DL MIMO transmissions and to reduce CSI feedback overhead from UE 710. For example, AN 705 may utilize the channel delay information, together with an estimate of the channel angle information, to generate appropriately beamformed CSI-RS ports. With the appropriately beamformed CSI-RS ports, UE 710 may then only need to feedback a small number of frequency domain basis vectors as part of the CSI feedback, resulting in reduced CSI feedback overhead.

Figure 8:
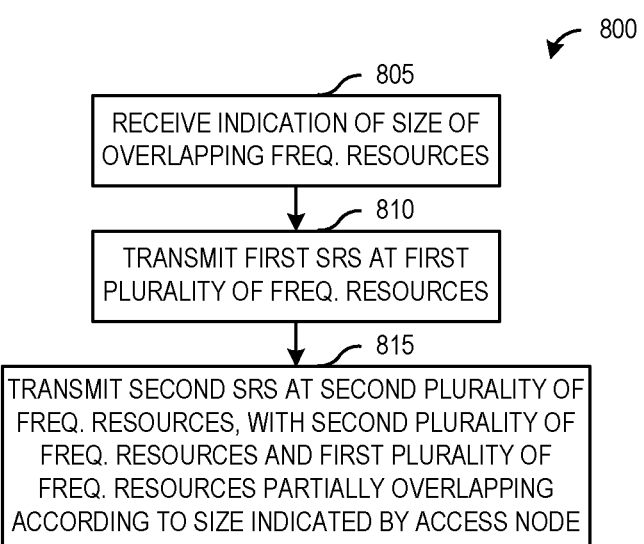
FIG. 8 illustrates a flow diagram of example operations occurring at a UE according to example embodiments presented herein.

FIG. 8 illustrates a flow diagram of example operations 800 occurring at a UE. Operations 800 may be indicative of operations occurring in a UE as the UE participates in wireless communications.

Operations 800 begin with the UE receiving an indication of the size of the overlapping frequency resources (block 805). The indication may be received from an AN, for example. The UE transmits a first SRS at a first plurality of frequency resources (block 810). The first SRS may be transmitted to the AN, for example. The UE transmits a second SRS at a second plurality of frequency resources, and the first plurality of frequency resources and the second plurality of frequency resources partially overlap (block 815). The second SRS may be transmitted to the AN, for example. The size of the overlapping frequency resources is set according to the size received in block 805.

Figure 9:
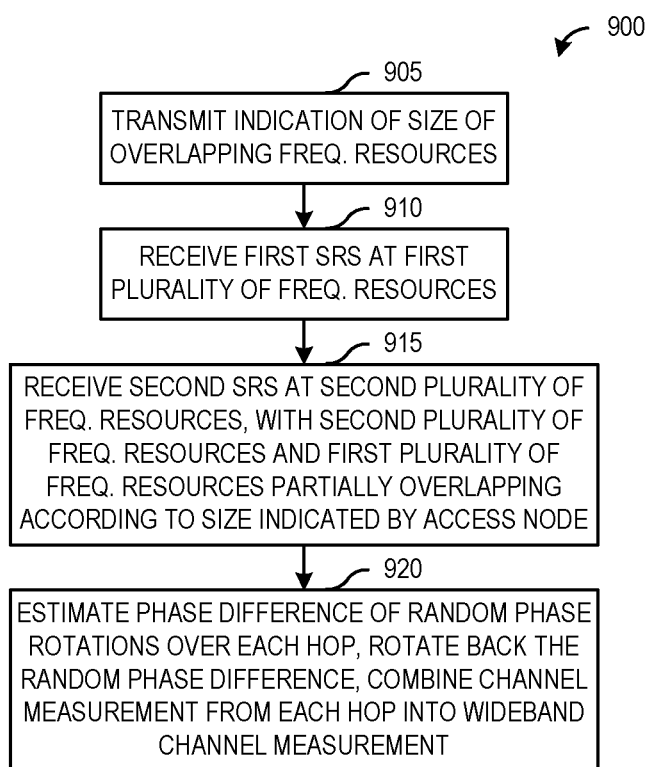
FIG. 9 illustrates a flow diagram of example operations occurring at an AN according to example embodiments presented herein.

FIG. 9 illustrates a flow diagram of example operations 900 occurring at an AN. Operations 900 may be indicative of operations occurring in an AN as the AN participates in wireless communications.

Operations 900 begin with the AN transmitting an indication of the size of the overlapping frequency resources (block 905). The indication may be transmitted to a UE or more than one UEs, for example. The AN receives a first SRS at a first plurality of frequency resources (block 910). The first SRS may be received from the UE, for example. The AN receives a second SRS at a second plurality of frequency resources, and the first plurality of frequency resources and the second plurality of frequency resources partially overlap (block 915). The second SRS may be received from the UE, for example. The size of the overlapping frequency resources is set according to the size transmitted in block 905. The AN generates a wideband channel measurement (block 920). The AN may generate a wideband channel measurement by utilizing the partially overlapped frequency resources between the first SRS and the second SRS. The partial overlap of frequency resources enables the AN to estimate the phase difference of the random phase rotation over each of the first SRS and the second SRS. As an example, the estimating of the phase difference of the random phase rotation is achieved by the AN performing measurements of each of the first SRS and the second SRS over the overlapping frequency resources, and assuming that the phase of the measured channel response should have been equal over the overlapping portion of the two SRSs. The measured phase difference over the overlapping portion of the two different SRSs may then be used as the phase difference of the random phase rotation over the two different SRSs. The AN may then rotate back the random phase differences between the two SRSs, and combine the channel measurement over the first SRS and the second SRS into a wideband channel measurement.

Figure 10:
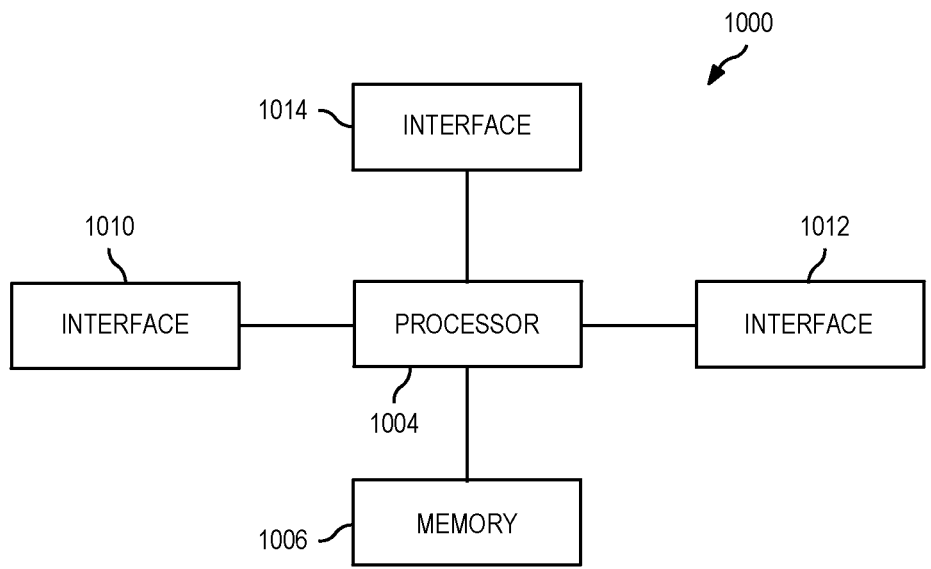
FIG. 10 illustrates a block diagram of an embodiment processing system for performing methods described herein, which may be installed in a host device.

FIG. 10 illustrates a block diagram of an embodiment processing system 1000 for performing methods described herein, which may be installed in a host device. As shown, the processing system 1000 includes a processor 1004, a memory 1006, and interfaces 1010-1014, which may (or may not) be arranged as shown in FIG. 10. The processor 1004 may be any component or collection of components adapted to perform computations and/or other processing related tasks, and the memory 1006 may be any component or collection of components adapted to store programming and/or instructions for execution by the processor 1004. In an embodiment, the memory 1006 includes a non-transitory computer readable medium. The interfaces 1010, 1012, 1014 may be any component or collection of components that allow the processing system 1000 to communicate with other devices/components and/or a user. For example, one or more of the interfaces 1010, 1012, 1014 may be adapted to communicate data, control, or management messages from the processor 1004 to applications installed on the host device and/or a remote device. As another example, one or more of the interfaces 1010, 1012, 1014 may be adapted to allow a user or user device (e.g., personal computer (PC), etc.) to interact/communicate with the processing system 1000. The processing system 1000 may include additional components not depicted in FIG. 10, such as long term storage (e.g., non-volatile memory, etc.).

In some embodiments, the processing system 1000 is included in a network device that is accessing, or part otherwise of, a telecommunications network. In one example, the processing system 1000 is in a network-side device in a wireless or wireline telecommunications network, such as a base station, a relay station, a scheduler, a controller, a gateway, a router, an applications server, or any other device in the telecommunications network. In other embodiments, the processing system 1000 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 11:
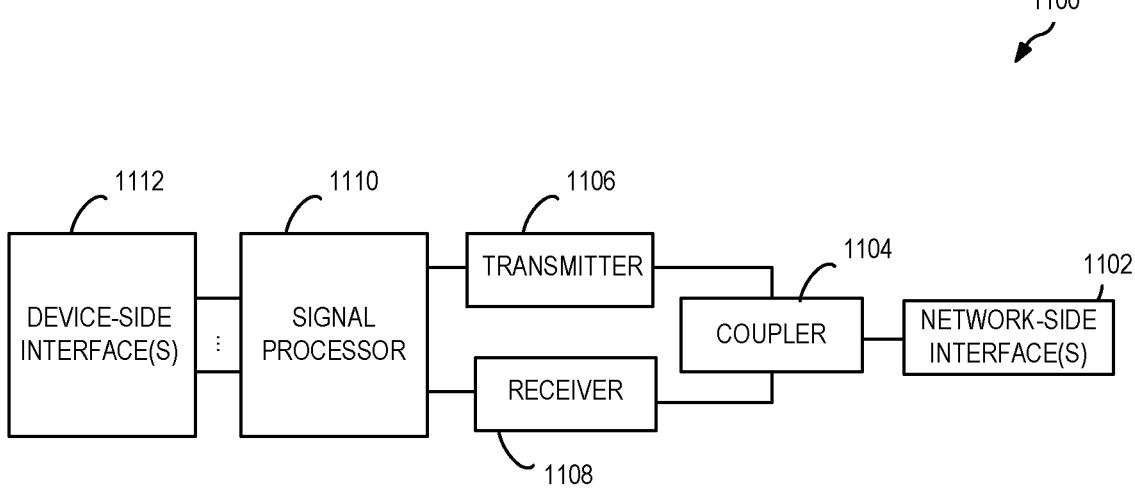
FIG. 11 illustrates a block diagram of a transceiver adapted to transmit and receive signaling over a telecommunications network according to example embodiments presented herein.

In some embodiments, one or more of the interfaces 1010, 1012, 1014 connects the processing system 1000 to a transceiver adapted to transmit and receive signaling over the telecommunications network. FIG. 11 illustrates a block diagram of a transceiver 1100 adapted to transmit and receive signaling over a telecommunications network. The transceiver 1100 may be installed in a host device. As shown, the transceiver 1100 comprises a network-side interface 1102, a coupler 1104, a transmitter 1106, a receiver 1108, a signal processor 1110, and a device-side interface 1112. The network-side interface 1102 may include any component or collection of components adapted to transmit or receive signaling over a wireless or wireline telecommunications network. The coupler 1104 may include any component or collection of components adapted to facilitate bi-directional communication over the network-side interface 1102. The transmitter 1106 may include any component or collection of components (e.g., up-converter, power amplifier, etc.) adapted to convert a baseband signal into a modulated carrier signal suitable for transmission over the network-side interface 1102. The receiver 1108 may include any component or collection of components (e.g., down-converter, low noise amplifier, etc.) adapted to convert a carrier signal received over the network-side interface 1102 into a baseband signal. The signal processor 1110 may include any component or collection of components adapted to convert a baseband signal into a data signal suitable for communication over the device-side interface(s) 1112, or vice-versa. The device-side interface(s) 1112 may include any component or collection of components adapted to communicate data-signals between the signal processor 1110 and components within the host device (e.g., the processing system 800, local area network (LAN) ports, etc.).

The transceiver 1100 may transmit and receive signaling over any type of communications medium. In some embodiments, the transceiver 1100 transmits and receives signaling over a wireless medium. For example, the transceiver 1100 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1102 comprises one or more antenna/radiating elements. For example, the network-side interface 1102 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1100 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Figure 12:
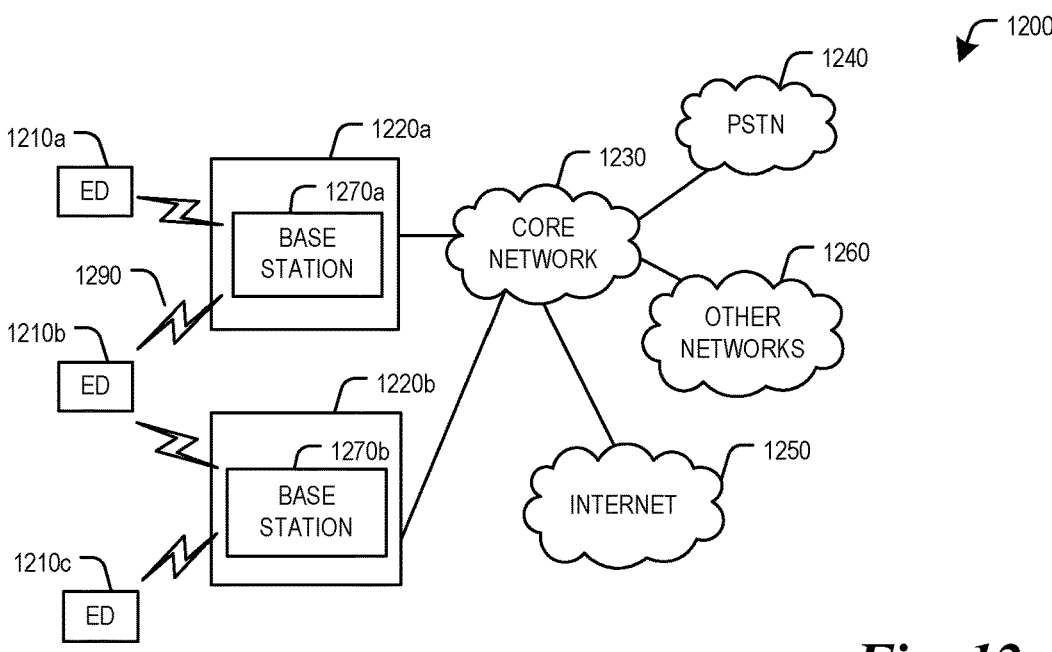
FIG. 12 illustrates an example communication system according to example embodiments presented herein.

FIG. 12 illustrates an example communication system 1200. In general, the system 1200 enables multiple wireless or wired users to transmit and receive data and other content. The system 1200 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 1200 includes electronic devices (ED) 1210a-1210c, radio access networks (RANs) 1220a-1220b, a core network 1230, a public switched telephone network (PSTN) 1240, the Internet 1250, and other networks 1260. While certain numbers of these components or elements are shown in FIG. 12, any number of these components or elements may be included in the system 1200.

The EDs 1210a-1210c are configured to operate or communicate in the system 1200. For example, the EDs 1210a-1210c are configured to transmit or receive via wireless or wired communication channels. Each ED 1210a-1210c represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 1220a-1220b here include base stations 1270a-1270b, respectively. Each base station 1270a-1270b is configured to wirelessly interface with one or more of the EDs 1210a-1210c to enable access to the core network 1230, the PSTN 1240, the Internet 1250, or the other networks 1260. For example, the base stations 1270a-1270b may include (or be) one or more of several well-known devices, such as a base transceiver station (BTS), a Node-B (NodeB), an evolved NodeB (eNodeB), a Next Generation (NG) NodeB (gNB), a Home NodeB, a Home eNodeB, a site controller, an access point (AP), or a wireless router. The EDs 1210a-1210c are configured to interface and communicate with the Internet 1250 and may access the core network 1230, the PSTN 1240, or the other networks 1260.

In the embodiment shown in FIG. 12, the base station 1270a forms part of the RAN 1220a, which may include other base stations, elements, or devices. Also, the base station 1270b forms part of the RAN 1220b, which may include other base stations, elements, or devices. Each base station 1270a-1270b operates to transmit or receive wireless signals within a particular geographic region or area, sometimes referred to as a "cell." In some embodiments, multiple-input multiple-output (MIMO) technology may be employed having multiple transceivers for each cell.

The base stations 1270a-1270b communicate with one or more of the EDs 1210a-1210c over one or more air interfaces 1290 using wireless communication links. The air interfaces 1290 may utilize any suitable radio access technology.

It is contemplated that the system 1200 may use multiple channel access functionality, including such schemes as described above. In particular embodiments, the base stations and EDs implement 5G New Radio (NR), LTE, LTE-A, or LTE-B. Of course, other multiple access schemes and wireless protocols may be utilized.

The RANs 1220a-1220b are in communication with the core network 1230 to provide the EDs 1210a-1210c with voice, data, application, Voice over Internet Protocol (VOIP), or other services. Understandably, the RANs 1220a-1220b or the core network 1230 may be in direct or indirect communication with one or more other RANs (not shown). The core network 1230 may also serve as a gateway access for other networks (such as the PSTN 1240, the Internet 1250, and the other networks 1260). In addition, some or all of the EDs 1210a-1210c may include functionality for communicating with different wireless networks over different wireless links using different wireless technologies or protocols. Instead of wireless communication (or in addition thereto), the EDs may communicate via wired communication channels to a service provider or switch (not shown), and to the Internet 1250.

Although FIG. 12 illustrates one example of a communication system, various changes may be made to FIG. 12. For example, the communication system 1200 could include any number of EDs, base stations, networks, or other components in any suitable configuration.

Figure 13A:
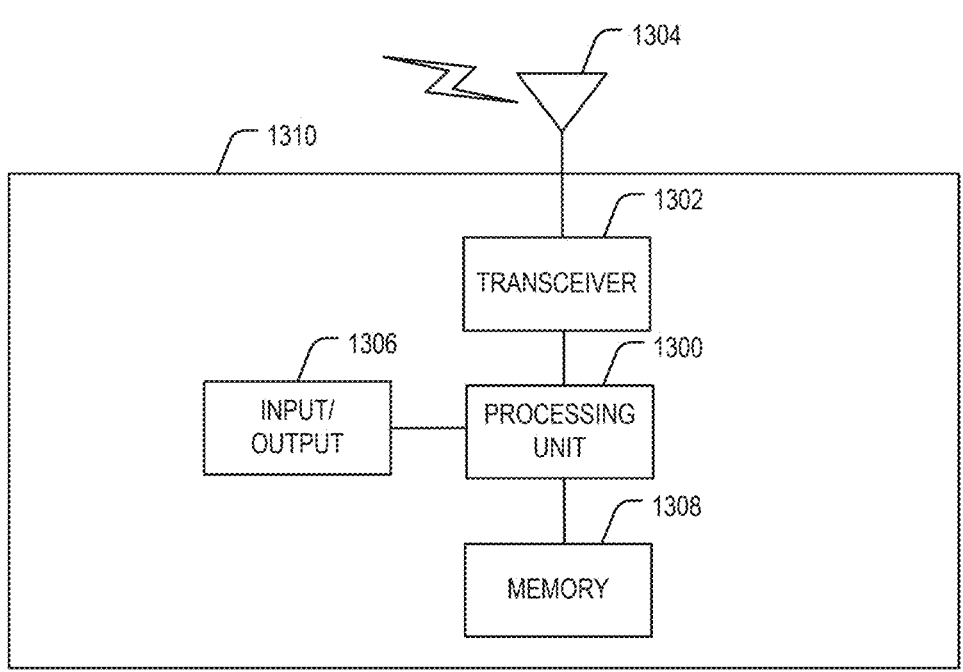
FIGS. 13A and 13B illustrate example devices that may implement the methods and teachings according to this disclosure.
Figure 13B:
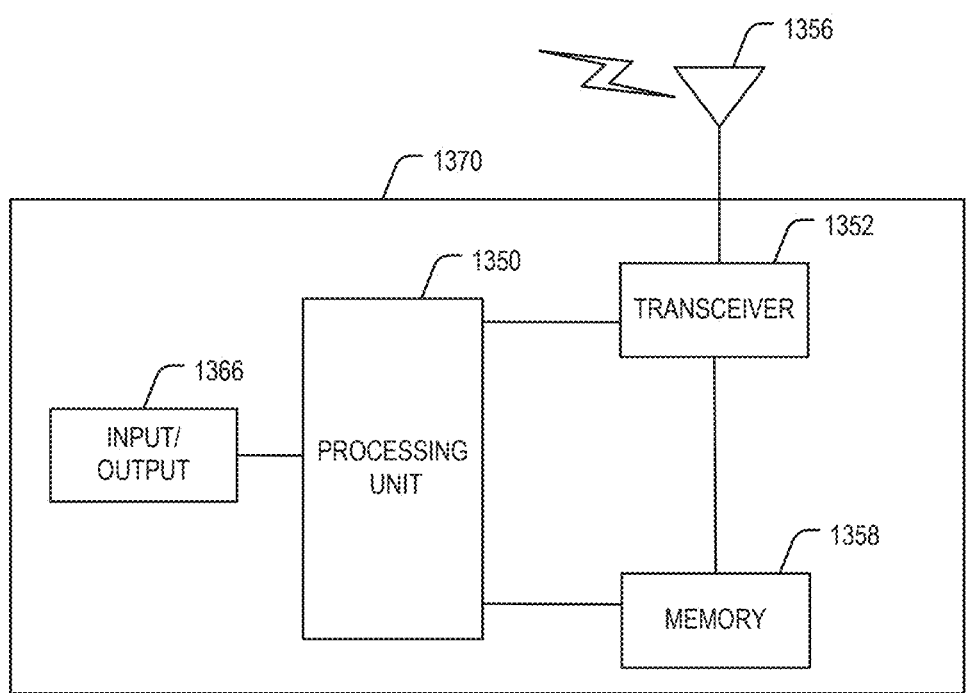

FIGS. 13A and 13B illustrate example devices that may implement the methods and teachings according to this disclosure. In particular, FIG. 13A illustrates an example ED 1310, and FIG. 13B illustrates an example base station 1370. These components could be used in the system 1200 or in any other suitable system.

As shown in FIG. 13A, the ED 1310 includes at least one processing unit 1300. The processing unit 1300 implements various processing operations of the ED 1310. For example, the processing unit 1300 could perform signal coding, data processing, power control, input/output processing, or any other functionality enabling the ED 1310 to operate in the system 1200. The processing unit 1300 also supports the methods and teachings described in more detail above. Each processing unit 1300 includes any suitable processing or computing device configured to perform one or more operations. Each processing unit 1300 could, for example, include a microprocessor, microcontroller, digital signal processor, field programmable gate array, or application specific integrated circuit.

The ED 1310 also includes at least one transceiver 1302. The transceiver 1302 is configured to modulate data or other content for transmission by at least one antenna or NIC (Network Interface Controller) 1304. The transceiver 1302 is also configured to demodulate data or other content received by the at least one antenna 1304. Each transceiver 1302 includes any suitable structure for generating signals for wireless or wired transmission or processing signals received wirelessly or by wire. Each antenna 1304 includes any suitable structure for transmitting or receiving wireless or wired signals. One or multiple transceivers 1302 could be used in the ED 1310, and one or multiple antennas 1304 could be used in the ED 1310. Although shown as a single functional unit, a transceiver 1302 could also be implemented using at least one transmitter and at least one separate receiver.

The ED 1310 further includes one or more input/output devices 1306 or interfaces (such as a wired interface to the Internet 1250). The input/output devices 1306 facilitate interaction with a user or other devices (network communications) in the network. Each input/output device 1306 includes any suitable structure for providing information to or receiving information from a user, such as a speaker, microphone, keypad, keyboard, display, or touch screen, including network interface communications.

In addition, the ED 1310 includes at least one memory 1308. The memory 1308 stores instructions and data used, generated, or collected by the ED 1310. For example, the memory 1308 could store software or firmware instructions executed by the processing unit(s) 1300 and data used to reduce or eliminate interference in incoming signals. Each memory 1308 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 13B, the base station 1370 includes at least one processing unit 1350, at least one transceiver 1352, which includes functionality for a transmitter and a receiver, one or more antennas 1356, at least one memory 1358, and one or more input/output devices or interfaces 1366. A scheduler, which would be understood by one skilled in the art, is coupled to the processing unit 1350. The scheduler could be included within or operated separately from the base station 1370. The processing unit 1350 implements various processing operations of the base station 1370, such as signal coding, data processing, power control, input/output processing, or any other functionality. The processing unit 1350 can also support the methods and teachings described in more detail above. Each processing unit 1350 includes any suitable processing or computing device configured to perform one or more operations. Each processing unit 1350 could, for example, include a microprocessor, microcontroller, digital signal processor, field programmable gate array, or application specific integrated circuit.

Each transceiver 1352 includes any suitable structure for generating signals for wireless or wired transmission to one or more EDs or other devices. Each transceiver 1352 further includes any suitable structure for processing signals received wirelessly or by wire from one or more EDs or other devices. Although shown combined as a transceiver 1352, a transmitter and a receiver could be separate components. Each antenna 1356 includes any suitable structure for transmitting or receiving wireless or wired signals. While a common antenna 1356 is shown here as being coupled to the transceiver 1352, one or more antennas 1356 could be coupled to the transceiver(s) 1352, allowing separate antennas 1356 to be coupled to the transmitter and the receiver if equipped as separate components. Each memory 1358 includes any suitable volatile or non-volatile storage and retrieval device(s). Each input/output device 1366 facilitates interaction with a user or other devices (network communications) in the network. Each input/output device 1366 includes any suitable structure for providing information to or receiving/providing information from a user, including network interface communications.

Figure 14:
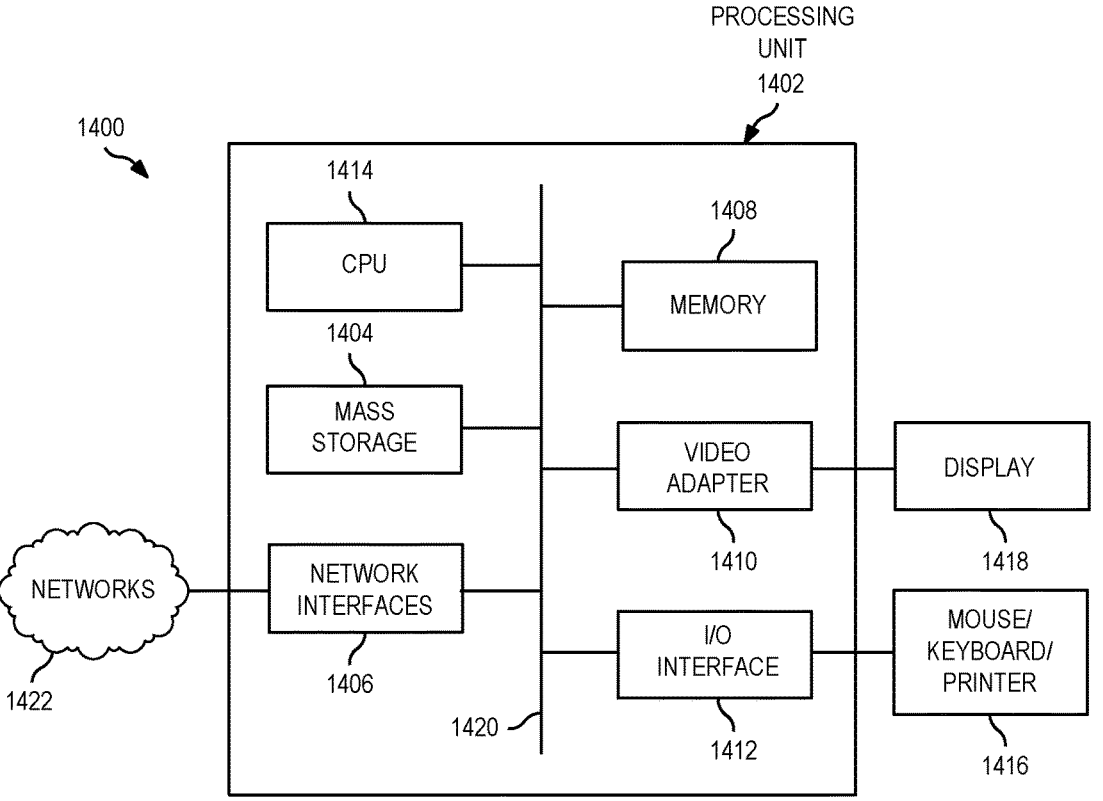
FIG. 14 is a block diagram of a computing system that may be used for implementing the devices and methods disclosed herein.

FIG. 14 is a block diagram of a computing system 1400 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1400 includes a processing unit 1402. The processing unit includes a central processing unit (CPU) 1414, memory 1408, and may further include a mass storage device 1404, a video adapter 1410, and an I/O interface 1412 connected to a bus 1420.

The bus 1420 may be one or more of any type of several bus architectures including a memory bus or memory controller, a peripheral bus, or a video bus. The CPU 1414 may comprise any type of electronic data processor. The memory 1408 may comprise any type of non-transitory system memory such as static random access memory (SRAM), dynamic random access memory (DRAM), synchronous DRAM (SDRAM), read-only memory (ROM), or a combination thereof. In an embodiment, the memory 1408 may include ROM for use at boot-up, and DRAM for program and data storage for use while executing programs.

The mass storage 1404 may comprise any type of non-transitory storage device configured to store data, programs, and other information and to make the data, programs, and other information accessible via the bus 1420. The mass storage 1404 may comprise, for example, one or more of a solid state drive, hard disk drive, a magnetic disk drive, or an optical disk drive.

The video adapter 1410 and the I/O interface 1412 provide interfaces to couple external input and output devices to the processing unit 1402. As illustrated, examples of input and output devices include a display 1418 coupled to the video adapter 1410 and a mouse, keyboard, or printer 1416 coupled to the I/O interface 1412. Other devices may be coupled to the processing unit 1402, and additional or fewer interface cards may be utilized. For example, a serial interface such as Universal Serial Bus (USB) (not shown) may be used to provide an interface for an external device.

The processing unit 1402 also includes one or more network interfaces 1406, which may comprise wired links, such as an Ethernet cable, or wireless links to access nodes or different networks. The network interfaces 1406 allow the processing unit 1402 to communicate with remote units via the networks. For example, the network interfaces 1406 may provide wireless communication via one or more transmitters/transmit antennas and one or more receivers/receive antennas. In an embodiment, the processing unit 1402 is coupled to a local-area network 1422 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units or modules may be hardware, software, or a combination thereof. For instance, one or more of the units or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the scope of the disclosure as defined by the appended claims.

What is claimed is:

1. A method comprising:
   receiving, by a communicating device from an access node, an indication of a size of overlapping frequency resources in the frequency domain, the size of the overlapping frequency resources being at least one physical resource block (PRB);
   transmitting, by the communicating device to the access node, a first sounding reference signal (SRS) of an SRS resource at a first plurality of frequency resources and at a first time; and
   transmitting, by the communicating device to the access node, a second SRS of the SRS resource at a second plurality of frequency resources and at a second time, wherein the second plurality of frequency resources and the first plurality of frequency resources partially overlap in accordance with the size of the overlapping frequency resources.

2. The method of claim 1, the indication being received over radio resource control (RRC) signaling.

3. The method of claim 1, the indication being received in a medium access control (MAC) control element (CE) or in a downlink control information (DCI) message.

4. The method of claim 1, wherein the indication specifies the size of the overlapping frequency resources in the frequency domain in terms of number of resource blocks.

5. A method comprising:
   transmitting, by an access node to a communicating device, an indication of a size of overlapping frequency resources in the frequency domain, the size of the overlapping frequency resources being at least one physical resource block (PRB);
   receiving, by the access node from the communicating device, a first sounding reference signal (SRS) of an SRS resource at a first plurality of frequency resources and at a first time; and
   receiving, by the access node from the communicating device, a second SRS of the SRS resource at a second plurality of frequency resources and at a second time, wherein the second plurality of frequency resources and the first plurality of frequency resources partially overlap in accordance with the size of the overlapping frequency resources.

6. The method of claim 5, the indication being transmitted over radio resource control (RRC) signaling.

7. The method of claim 5, the indication being transmitted in a medium access control (MAC) control element (CE) or in a downlink control information (DCI) message.

8. A user equipment (UE) comprising:
   one or more processors; and
   a non-transitory memory storage comprising instructions that, when executed by the one or more processors, cause the UE to perform operations including:
      receiving, from an access node, an indication of a size of overlapping frequency resources in the frequency domain, the size of the overlapping frequency resources being at least one physical resource block (PRB);

transmitting, to the access node, a first sounding reference signal (SRS) of an SRS resource at a first plurality of frequency resources and at a first time; and transmitting, to the access node, a second SRS of the SRS resource at a second plurality of frequency resources and at a second time, wherein the second plurality of frequency resources and the first plurality of frequency resources partially overlap in accordance with the size of the overlapping frequency resources.

9. The UE of claim 8, the indication being received over radio resource control (RRC) signaling.

10. The UE of claim 8, the indication being received in a medium access control (MAC) control element (CE) or in a downlink control information (DCI) message.

11. An access node comprising:

one or more processors; and a non-transitory memory storage comprising instructions that, when executed by the one or more processors, cause the access node to perform operations including:

transmitting, to a user equipment (UE), an indication of a size of overlapping frequency resources in the frequency domain, the size of the overlapping frequency resources being at least one physical resource block (PRB);

receiving, from the UE, a first sounding reference signal (SRS) of an SRS resource at a first plurality of frequency resources and at a first time; and receiving, from the UE, a second SRS of the SRS resource at a second plurality of frequency resources and at a second time, wherein the second plurality of frequency resources and the first plurality of frequency resources partially overlap in accordance with the size of the overlapping frequency resources.

12. The access node of claim 11, the indication being transmitted prior to receiving the first SRS.

13. The access node of claim 11, the indication being transmitted over radio resource control (RRC) signaling or in a medium access control (MAC) control element (CE).

14. The access node of claim 11, the indication being transmitted in a downlink control information (DCI) message.

15. The access node of claim 11, the size of the overlapping frequency resources being an integer multiple of a PRB.

* * * * *